(12) United States Patent
Song et al.

(10) Patent No.: US 11,800,383 B2
(45) Date of Patent: Oct. 24, 2023

(54) ON-DEVICE NETWORK SIMULATION WITH USER DATA LOOPBACK FOR DEVICE TESTING

(71) Applicant: QUALCOMM Incorporated, San Diego, CA (US)

(72) Inventors: Wei-Jei Song, San Diego, CA (US); Shailesh Maheshwari, San Diego, CA (US); Prabhu Kandasamy, San Diego, CA (US); Thomas Sherwin, San Diego, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/320,732

(22) Filed: May 14, 2021

(65) Prior Publication Data
US 2022/0369132 A1 Nov. 17, 2022

(51) Int. Cl.
*H04W 24/06* (2009.01)
*H04L 1/00* (2006.01)
*H04W 72/23* (2023.01)

(52) U.S. Cl.
CPC .......... *H04W 24/06* (2013.01); *H04L 1/0025* (2013.01); *H04W 72/23* (2023.01)

(58) Field of Classification Search
CPC .. H04L 1/0025; H04W 72/042; H04W 24/06; H04W 72/23
USPC ........................................................ 370/329
See application file for complete search history.

(56) References Cited

U.S. PATENT DOCUMENTS

| | | | |
|---|---|---|---|
| 8,019,333 B2 | 9/2011 | Seckendorf et al. | |
| 9,538,404 B2 | 1/2017 | Seckendorf et al. | |
| 2014/0162628 A1* | 6/2014 | Bevelacqua | H04B 17/15 |
| | | | 455/423 |

(Continued)

FOREIGN PATENT DOCUMENTS

| | | | | |
|---|---|---|---|---|
| CN | 114430927 A | * | 5/2022 | ........... H04L 1/0061 |
| EP | 2262134 A2 | | 12/2010 | |

OTHER PUBLICATIONS

International Search Report and Written Opinion—PCT/US2022/071699—ISA/EPO—dated Jul. 28, 2022 (184975WO).

*Primary Examiner* — Rownak Islam
(74) *Attorney, Agent, or Firm* — Dalei Dong; Norton Rose Fulbright US LLP

(57) ABSTRACT

A user equipment (UE) may simulate transmissions received from a BS to perform on-device testing of the UE. For example, the UE may be configured to loopback uplink data from the UL data path and input the uplink data as simulated downlink data for processing in the DL data path. The uplink data may include data related to a video call or network diagnostics. The user application data generated by the application and proceeding through the UL data path may be used to validate the DL data path. Downlink control information (DCI) may be determined by the UE and provided to the DL data path to accompany the uplink data. The DCI may include simulated uplink grants and/or simulated downlink scheduling assignments. The simulated downlink scheduling assignments may be determined based on availability of the uplink data in the UE's memory.

30 Claims, 12 Drawing Sheets

(56) References Cited

U.S. PATENT DOCUMENTS

2016/0014625 A1* 1/2016 Devarasetty .......... H04W 24/06
 370/252

* cited by examiner

ON-DEVICE NETWORK SIMULATION WITH USER DATA LOOPBACK FOR DEVICE TESTING

FIELD OF THE DISCLOSURE

Aspects of the present disclosure relate generally to wireless communication systems, and more particularly, to device testing for wireless communication systems. Some features may enable and provide improved testing using on-device network simulation of wireless communication systems by generating control signaling and re-using uplink data for validation of a downlink data path.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. During operation on a physical network, a downlink transmission from the base station may encounter interference due to transmissions from neighbor base stations or from other wireless radio frequency (RF) transmitters. Likewise, during operation on a physical network, an uplink transmission from the UE may encounter interference from uplink transmissions of other UEs communicating with the neighbor base stations or from other wireless RF transmitters. This interference may degrade performance on both the downlink and uplink, but the random nature of the interference also increases the challenges in diagnosing errors that occur on either the UE or the BS.

Conventionally, diagnosing problems with UEs is performed by isolating the UE from operational wireless networks and using specialized test equipment to send test sequences of commands and data to the UE so that the UE's response can be evaluated. However, the specialized test equipment limits testing to certain locations and certain conditions. For example, the specialized test equipment cannot replicate the noisy real-world environment of an operational wireless network. Yet, the unexpected, and sometimes unrepeatable, noise and other random events in an operational wireless network present challenges in testing UEs on an operational wireless network. Thus, diagnosing mobile devices within the context of an operational wireless network is undesirable.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

BRIEF SUMMARY OF SOME EXAMPLES

Further testing capabilities that can be performed with limited additional equipment would be desirable to improve device design and/or device testing for wireless devices, such as a user equipments (UEs) or base stations (BSs). On-device testing can be provided, for example, by simulating at least one aspect of a wireless network on the device. Simulation of a wireless network may include generating signals conventionally generated by a base station (BS). For example, the UE may be configured to generate at least some of the signals conventionally generated by the BS in a testing mode, such that UE operations may be performed and evaluated using the simulated signals. For example, errors in code or circuitry involved in the processing of data from the wireless network may be diagnosed during device design by operating a test device in this testing mode. As another example, UEs may be subject to compliance testing prior to activation on a wireless network. Providing a means to perform such compliance testing without specialized testing equipment would allow devices to be made available for use on wireless networks quicker. In another example, UEs may have operating parameters, such as circuit temperature, and the UE may be tested using an on-chip test sequence and the temperature monitored during the test and compared with an expected thermal profile to determine whether the decoding is functioning properly. Thus, in some aspects, on-device testing capability by providing wireless network simulations within the device reduces or eliminates reliance on specialized testing equipment. The on-device testing may be provided on-chip, such that one or more processors of the device may be used both for operation on the physical network and used to simulate transmissions received from a BS of a wireless network. In some embodiments, a system-on-chip (SoC) may include a digital signal processor (DSP), a central processing unit (CPU), and wireless connectivity on a single integrated circuit (IC), and the DSP may be configured to simulate the wireless network while the remainder of the SoC continues to operate similarly or the same whether in testing mode or connected to a physical wireless network.

One technique for a UE to simulate transmissions received from a BS is to simulate data of a wireless network using user data being generated by the UE. For example, the UE may be configured to loopback uplink data from the UL data path to the DL data path. In such an operation, the uplink (UL) data path of the UE to validate the downlink (DL) data path. The re-use of the uplink data for testing the DL data path reduces the burden on the device in simulating a wireless network. Similarly, the BS may loopback DL data received from a UE over a wireless network to use to simulate data of a wireless network for transmission to a UE. Devices operating on a wireless network regularly transmit data to and from numerous servers through the BS, sometimes large amounts of data. Storage of such large amounts of data for use during a simulation would require significant storage space on the UE or BS. This may restrict on-device testing capabilities, in particular, on the UE due to the limited storage space, the limited power availability, and/or the availability of only metered connections on the UE. A user operating the UE may already be generating data through the use of applications on the UE, such as video call applications or network diagnostic applications. That user application data processed in the UL data path may be used to validate the DL data path. In some wireless networks, a symmetry exists between uplink frames and downlink frames, or other units of data on the UL data path and DL data path, that allows the uplink data to be input to the DL data path with little or no modification. The DL data path may process the uplink data in the same or slightly modified format to allow evaluation of the DL data path processing, such as to validate one or more wireless network standards and/or evaluate a thermal profile and/or power consumption profile of the UE.

Configuring the UE to use the UL data path of the UE to validate the DL data path may involve the activating and/or deactivating of certain circuitry and/or datapaths and/or certain software to change a source or destination of information for processing performed by the circuitry or software. For example, a software process may be configured to receive input from memory such that the software process retrieves uplink data from the memory for processing as simulated downlink data. As another example, DL data path circuitry may be configured to receive input from memory such that the circuit retrieves uplink data from the memory for processing as simulated downlink data. The circuitry may thus be configured to ignore input from and/or to disconnect from radio frequency (RF) circuitry or other circuitry that would provide data for DL data path processing when operating on a physical wireless network. As a further example, UL data path circuitry may be configured to activate a datapath for outputting of formatted user data to memory. As yet another example, a grant processor may be configured to receive input grants from a simulated control channel (CCH) or a physical control channel (CCH) for processing DL data and/or generating formatting UL data.

Loopback of uplink data for validating the downlink path has numerous benefits in the testing of wireless devices. Using data in the DL data path that is already being generated by a user reduces the need to generate user application data on demand and/or to retrieve large amounts of user application data that would require storage on the UE. Generating simulated user application data without storing the predetermined user data may require processing resources on the UE, but that processing is reduced by using data already processed in a user application. Reducing the use of processing resources on the UE to generate test data reduces power consumption, which may be particularly important for a mobile device operating from battery power. An alternative to generating simulated user application data is to store simulated user application data that can be retrieved in a testing mode of the UE. However, such stored simulated user application data may require additional components in the UE or reduce the availability of storage space in the UE for user data and user applications. Reducing the amount of data stored at the UE for the testing mode, such as by reducing the need for storing simulated user application data may reduce the cost of and other compromises made in the design of the UE to accommodate the testing mode. Thus, in some aspects, the simulated user application data for processing in the DL data path is based, in whole, or in part, on loopback data from a user application. In some aspects, the simulated user application data may be supplemented by a stored test sequence of data and/or supplemented by executing a test sequence to generate data. The reduction in processing and storage resources allowed by inputting uplink data for validating the downlink path may provide these and other benefits. The loopback of data may support various levels of continuous integration at development, chip bring-up, and commercialization.

The reduction in processing and storage resources may be particularly beneficial in the testing of the UE on high-speed data networks. For example, high-speed data networks, such as 5G sub-6 wireless networks and 5G mmWave wireless networks, provide wide bandwidth for the transmission of data, such as by using carrier aggregation (CA) techniques which combine bandwidth from multiple carriers to transmit a data stream. Testing wide bandwidth communication networks may use larger amounts of data to fill in the wide bandwidth, which further increases the processing and/or storage capabilities of the UE. These processing and/or storage requirements may exceed the resources otherwise required by the UE for operation on a wireless network. A video application executed by the user may generate high-definition (HD) video data, such as from a video call application, artificial reality (AR) application, live streaming application, camera application, and/or rendered video game application may generate a high bandwidth data stream that is suitable for testing of wide bandwidth communications networks, such as networks employing carrier aggregation (CA) to combine multiple carriers or combine multiple bandwidth parts (BWPs). Thus, the use of uplink data to validate the DL data path of the UE may allow testing of the UE with little or no additional processing and/or storage capabilities beyond those otherwise used for communications on the wireless network. Thus, there may be little or no additional cost of incorporating the testing mode functionality in the UE.

The UE in testing mode may generate control signals to accompany the uplink data or other data used to validate the DL data path. For example, testing of the DL data path may include providing control signals regarding the downlink information to more accurately replicate operation on a wireless network by replicating downlink information conventionally generated by the BS. Downlink control information (DCI) may be generated by the UE and provided to the DL data path to accompany the uplink data. The DCI may include simulated uplink grants and/or simulated downlink scheduling assignments. The simulated downlink scheduling assignments may be generated based on availability of the uplink data in the UE's memory. The UE's memory may introduce delays in the data from the UL data path that may be accommodated by delaying the simulated downlink scheduling assignments to align the simulated downlink scheduling assignments with availability of the data from the UE's memory. The simulated downlink scheduling assignments may also or alternatively be delayed to replicate delays in network communication expected when communicating with a BS and servers through the BS on a physical wireless network. For example, delays may be added to replicate a delay for signals traversing air from the UE to the BS, from the BS through a backhaul connection to a server, back to the BS through the backhaul connection, and/or traversing air from the BS back to the UE.

The generation of control signals may be used to provide flexibility in the network simulation to accommodate testing of different functionality in the UE. For example, timing of downlink scheduling assignments and/or timing of uplink grants in simulated downlink control information (DCI) may be adjusted within certain margins to evaluate operations of the UE. In some aspects, the timing may be adjusted to test operation of functionality apart from the wireless functionality. For example, timings may be adjusted to measure performance of the memory storing the uplink data for loopback to the DL data path. As another example, certain control signals may be generated to reduce the amount of processing involved in the simulation of the wireless network. For example, control signals indicating an acquisition success may be input to the DL data path to avoid the need of the UE to simulate signals for operations such as cell searching and cell acquisition.

The testing mode may facilitate dynamic scenario generation and/or scenario replay support. For example, a test scenarios may be stored with a device configuration (including, for example, whether the simulated network is a 4G LTE, 5G, or other radio access technology (RAT), the RF band or band combinations involved in the simulation, state of configuration registers in the circuitry, state of settings in the software, firmware version, operating system version, user applications executing during the simulation and associated information and settings), a test sequence, and/or some of all of the simulated downlink data. The test scenario may be used to replay a predetermined scenario or to replay a previous scenario involving the simulated downlink data on the UE. Thus, when problems are identified during validation, the scenario that caused the problem may be saved and repeated during later testing after potentially resolving the problem to support device development. The scenario may also be exported from the UE and loaded onto another UE with similar testing capability to identify whether an identified problem exists on other devices or other configurations. The scenario may be automatically carried out in a script that reruns variation of the scenario to identify a particular problem with the device.

Aspects of device testing using a simulated wireless network facilitated by the disclosure herein may allow operation of a user application by the UE to operate on the simulated wireless network. A user application executing on the UE may receive the loopback data, or a delayed version of the loopback data, to allow continued execution of the user application on the simulated wireless network. For example, a video call application may generate video of a first user using the UE and transmit the user's video through the UL data path as uplink data. The uplink data may be stored in memory, delayed, and processed through the DL data path as though the uplink data reflects a second user in the video call. The video call application may receive the loopback data and display a delayed version of the first user's video as another participant in the video call. An additional benefit of the re-use of the uplink data in this and other scenarios is that the user may be able to easily detect processing errors by noticing artifacts or errors in the second user's video. The UE may be configured to modify the user application data to accommodate the user application that will receive the uplink data. For example, the UE may switch source and destination addresses in the uplink data so that the user application receiving the uplink data is able to correctly process the uplink data as received data. Another example of a user application that may be used in the simulated wireless network is network testing applications, such as applications that generate and validate Internet Control Message Protocol (ICMP) requests and responses, such as part of a ping operation.

In some aspects, the wireless device may operate in the simulated first wireless network in a testing mode while, in parallel, operating in an operational mode or simulation mode on a second wireless network. Thus, wireless connectivity may be maintained during the testing of the device to reduce interruption of the user's experience operating the device. The device may continue to provide network functionality, such as retrieving news updates, email, messages, or other functionality, through the second wireless network while testing functionality related to the first wireless network. The simulation and operation on first and second wireless networks may involve operation on the same or different wireless networks. For example, a 5G sub-6 wireless network may be simulated in testing mode while communication continues on a 4G LTE wireless network. The operational and simulated wireless network may be switched after testing the first wireless network to accommodate testing of different hardware or software involved in operation on the different wireless networks. Maintaining operation on a second wireless network may also allow remote monitoring of the testing on the first wireless network and/or allow remote review of the results of the testing on the first wireless network.

In some aspects, the device may simulate multiple wireless networks in parallel with memory being used to loopback uplink data to each of the downlink data paths. For example, a single user application may generate data that is stored in memory and provided as simulated downlink data to multiple DL data paths corresponding to different wireless networks for processing and validation. As another example, multiple user applications may generate, for example, first data and second data that is stored in memory. The first data may be input to a first DL data path as simulated downlink data for a first wireless network. The second data may be input to a second DL data path as simulated downlink data for a second wireless network, and the second wireless network may be simulated in parallel with a first wireless network.

Although certain operations are described as performed by the device to simulate wireless network operations, such as operations performed by a BS, the device may be configured to perform any operations or any combination of operations performed by the BS or other network equipment to accommodate testing of certain functionality within the UE.

In general, this disclosure describes a user equipment having a memory and a processor coupled to the memory. The processor may be configured to perform operations including one or more of generating downlink control information (DCI) of a first wireless network; generating, based at least in part on the DCI, uplink data from an UL data path; storing the uplink data in the memory; retrieving the uplink data from the memory for use as simulated downlink data of the first wireless network; processing the simulated downlink data in a DL data path; and/or evaluating the processing of the simulated downlink data in the DL data path. The evaluating may include one or more of: determining compliance of the processing with one or more wireless standards, such as 2G, 3G, 4G, or 5G wireless standards; determining a thermal profile of the processor and/or other components of the user equipment during the processing; determining a power profile (e.g., recording during the processing as a function of time which components are enabled, power settings for those components, power consumed by those components, battery voltage, battery level, charging status, etc.) of the apparatus during the processing; and/or determining power consumption of the processor and/or other components of the user equipment during the processing. In some aspects, generating the DCI may include generating a simulated downlink scheduling assignment for the simulated downlink data corresponding to the uplink data. In some aspects, generating the DCI may include generating uplink grants corresponding to the uplink data. In some aspects, one or more operations, such as the generating of downlink control information (DCI) of a first wireless network, may be performed by a digital signal processing (DSP) portion of the processor. In some aspects, the DSP may operate in coordination with a grant processor in wireless connectivity coupled to the DSP of the processor, wherein the grant processor is configured to control, such as by activating a data path, the wireless connectivity for storing the uplink data in the memory. In some aspects, the UE may operate in the simulated first wireless network in a testing mode while, in parallel, operating in an operational mode on a second wireless network.

The processor or other components of the UE may be configured to perform operations in addition to simulating the network to accommodate the network simulation. For example, the processor may be configured to perform operations including receiving user application data for packaging as the uplink data. In some aspects, this packaging may include packaging first video data for a first participant of a video call, wherein processing the simulated downlink data comprises simulating a second participant for the video call based on the simulated downlink data. In some aspects, receiving user application data comprises receiving an Internet Control Message Protocol (ICMP) request, wherein processing the simulated downlink data comprises switching a source address and a destination address for generating an ICMP response.

In one aspect of the disclosure, a method includes generating downlink control information (DCI) of a first wireless network; generating, based at least in part on the DCI, uplink data from an UL data path; storing the uplink data in the memory; retrieving the uplink data from the memory for use as simulated downlink data of the first wireless network; processing the simulated downlink data in a DL data path; and/or evaluating the processing of the simulated downlink data in the DL data path.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including generating downlink control information (DCI) of a first wireless network; generating, based at least in part on the DCI, uplink data from an UL data path; storing the uplink data in the memory; retrieving the uplink data from the memory for use as simulated downlink data of the first wireless network; processing the simulated downlink data in a DL data path; and/or evaluating the processing of the simulated downlink data in the DL data path.

In an additional aspect of the disclosure, a non-transitory computer-readable medium stores instructions that, when executed by a processor, cause the processor to perform operations including those described in the method and techniques described herein. For example, the operations may include generating downlink control information (DCI) of a first wireless network; generating, based at least in part on the DCI, uplink data from an UL data path; storing the uplink data in the memory; retrieving the uplink data from the memory for use as simulated downlink data of the first wireless network; processing the simulated downlink data in a DL data path; and/or evaluating the processing of the simulated downlink data in the DL data path.

In some aspects, an apparatus, such as a user equipment (UE) or base station (BS), includes a wireless transceiver; and a digital signal processor (DSP) coupled to the wireless transceiver, wherein the DSP is configured to execute a test sequence for communicating on a wireless network in accordance with a wireless network specification by manipulating inputs to the wireless transceiver; to receive outputs from the wireless transceiver; and to analyze performance of the wireless transceiver on the wireless network in accordance with the wireless network specification based, at least in part, on the received outputs. The DSP may be configured to analyze performance of the wireless transceiver by comparing the outputs with expected outputs corresponding to the test sequence; to analyze performance of the wireless transceiver by determining compliance of the received outputs with the wireless network specification; to analyze performance of the wireless transceiver by determining power consumption during the test sequence; and/or to analyze performance of the wireless transceiver by determining thermal and/or power consumption conditions during the test sequence. The apparatus may include a central processing unit (CPU), such as an applications processor (AP), for executing user applications that generate user data for transmission over a wireless network as uplink data, in which the user data may be used by the wireless transceiver for generating simulated downlink data. In some aspects, the user data may be video call data, in which a delayed version of the user's video is used to simulate a second participant in a video call, such that the operation of the wireless transceiver may be tested.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

On-device testing may be provided by simulating at least part of a wireless network. In some aspects, the testing may be provided on a chip having the wireless network functions, such as a wireless transceiver processor. One or more processors of the device may be re-used to simulate transmissions received from a wireless network. In some aspects, a system-on-chip (SoC) may include a digital signal processor (DSP), a central processing unit (CPU), and wireless connectivity on a single integrated circuit (IC), and the DSP may be configured to simulate, in part, the wireless network, while the remainder of the SoC continues to operate in the same mission mode. An example apparatus and associated functionality is shown in FIG. 1 that may, in some aspects of the disclosure, be incorporated in a SoC.

Figure 1:
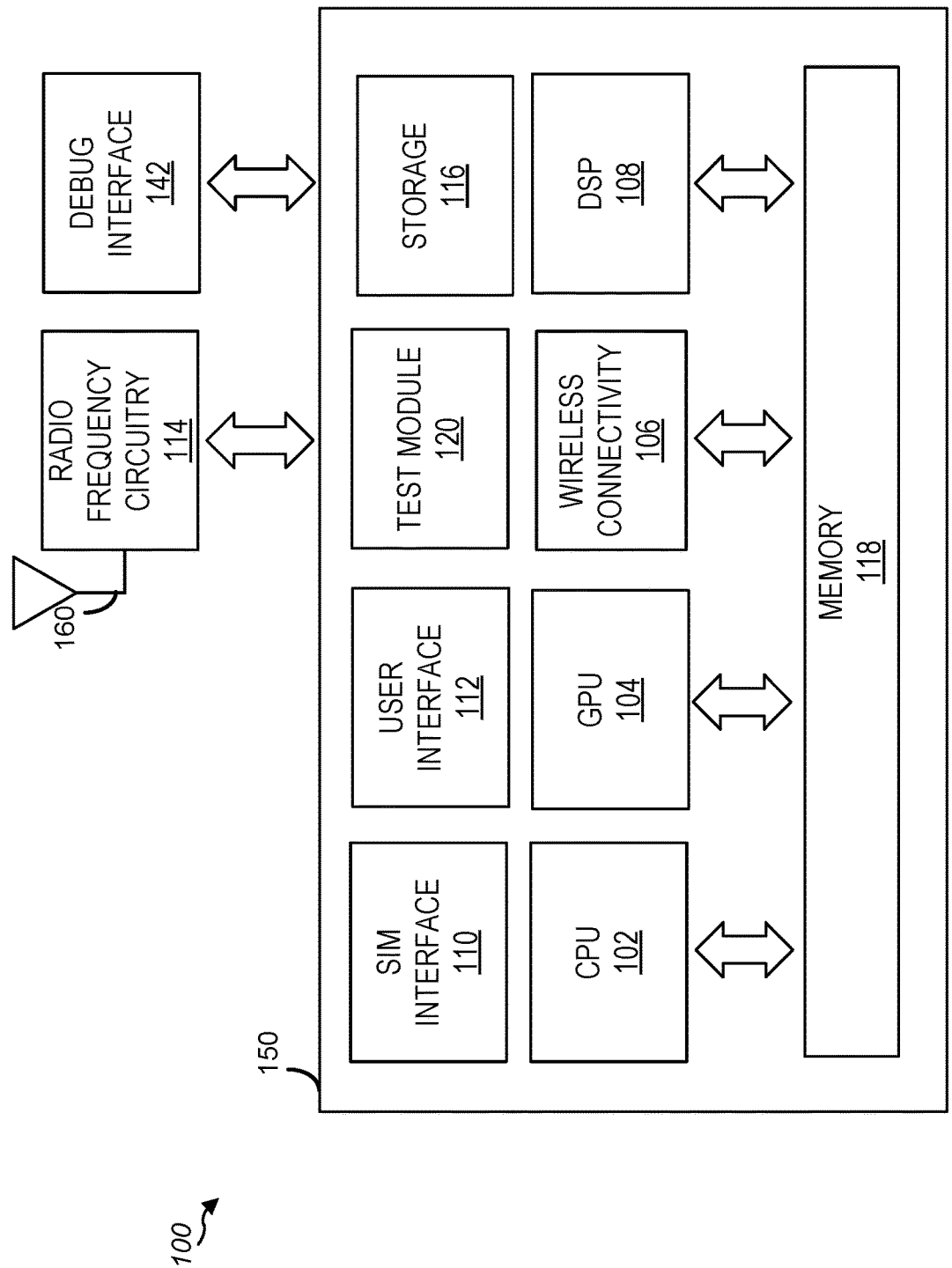
FIG. 1 is a block diagram illustrating an apparatus with testing capability for simulating wireless network communications according to one or more aspects.

FIG. 1 is a block diagram illustrating an apparatus with testing capability for simulating network communications according to one or more aspects of the present disclosure. An apparatus 100, such as a user equipment (UE) or a base station (BS), may include wireless connectivity 106. The wireless connectivity 106 may be, for example, circuitry to provide transmit and/or receive functionality on a wireless network to other components of the apparatus 100. The wireless connectivity 106 may include logic circuitry for formatting data for transmission according to one or more wireless protocols or wireless standards, for extracting data from transmissions received according to one or more wireless protocols or wireless standards, for monitoring a status of one or more wireless networks, for receiving instructions from one or more wireless networks, and/or for performing other functions relating to the one or more wireless networks. Example wireless networks that may be connected to the apparatus 100 through wireless connectivity 106 include wireless local area networks (WLANs), wireless wide area networks (WWANs) including cellular networks such as 2G, 3 G, 4G, 5G networks, and/or other generations of networks, satellite networks, radio frequency (RF) point-to-point networks, and personal area networks (PANs) for short-range communications to nearby devices, and other networks that may use radio frequency (RF)-based communication or other communication techniques such as infrared (IR) signaling. Example wireless networks are described in more detail below with reference to FIG. 9 and FIG. 10. The wireless connectivity 106 may use other circuitry, such as radio frequency (RF) circuitry 114 for accessing the physical radio frequency bands used by the wireless network, such as circuitry for conveying wireless signals over the air through antenna 160. The RF circuitry 114 may include, for example, a RF front-end (RFFE) module comprising one or more filters, power amplifiers, detectors, and/or external inductances, capacitances, or impedances.

The wireless connectivity 106 may be part of a system on chip (SoC) 150 with other analog and/or digital circuitry. The SoC 150 may be an integrated circuit including circuitry for performing different functions on a single substrate. For example, the SoC 150 may include one or more of a central processing unit (CPU) 102, a graphics processing unit (GPU) 104, a digital signal processor (DSP) 108, memory 118, and storage 116. The SoC 150 may further include user interface circuitry 112, such as a display interface, a touch screen interface, a keypad interface, a stylus interface, or other interfaces for providing output to a user or receiving input from a user. The SoC 150 may further include a SIM interface 110 for accessing authentication information for accessing one, two, or more wireless networks. SIM interface 110 may support dual-SIM dual-standby (DSDS) or dual-SIM dual-active (DSDA) configurations in mission mode and/or testing modes of the apparatus 100. The CPU 102, GPU 104, wireless connectivity 106, and DSP 108 may share access to the memory 118 through a memory controller that functions as an arbitrator between multiple devices that access the memory 118. In some aspects, memory 118 may include several memory components, including memory located within different components of the apparatus 100 and/or different types of memory within the apparatus 100.

In some aspects, operation on multiple wireless networks may be supported by SIM interface 110. The configurations described according to different aspects of the disclosure may be configured to support multiple wireless networks. In another aspect, operation on a single wireless network may be supported by SIM interface 110. The on-chip simulations described in various aspects of the disclosure may be performed in parallel with operation on wireless networks authenticated by the SIM interface 110. For example, the UE may communicate on a physical global system for mobile communications (GSM) and simulate communications on a 4G long term evolution (LTE) wireless network. The SIM interface 110 may support two or more SIM cards and/or electronic SIMs for communicating on one or more of the wireless networks.

The apparatus 100 may be configured to support multiple modes of operation, and some of the modules may be configured to perform different functionalities depending on a current mode of operation. For example, the apparatus 100 may have a testing mode, in which the apparatus 100 is configured to simulate at least a portion of one wireless network. When the apparatus 100 is a user equipment (UE) device, such as a mobile phone, the testing mode may involve simulating at least a portion of a wireless network that would normally be operated by one or more base stations in the wireless network. In testing mode, the apparatus 100 may inhibit the transmission and/or reception of certain data through the antenna 160 and/or RF circuitry 114. When the apparatus 100 is a base station (BS) device, such as an evolved Node B (eNB), the testing mode may involve simulating at least a portion of one wireless network that would normally be operated by one or more user equipments (UEs) in the wireless network or other base stations (BSs) in the wireless network. As another example, the apparatus 100 may have a mission mode, in which the apparatus 100 operates in accordance with a role in the wireless network by transmitting and/or receiving signals through an antenna. When the apparatus 100 is a user equipment (UE), the mission mode may involve receiving commands and data from a base station and decoding the received data in accordance with the received commands. In mission mode, the UE may be connected in a testing environment to perform testing of the UE without altering the operation of the UE or simulating any portion of the wireless network on the UE. In mission mode, the UE may also be in operation in a deployed wireless network. When the apparatus 100 is a base station (BS), the mission mode may involve scheduling network resources for transmission and reception of data by UEs and transmitting commands and data to the UEs in accordance with the determined scheduling. If the apparatus 100 supports multiple wireless networks, each of the supported wireless networks may be operating in a different mode, such as by operating in mission mode on a 4G LTE network and in testing mode on a 5G NR network.

The SoC 150 may execute applications that interact with a user of the apparatus 100. For example, CPU 102 may execute applications, such as video streaming applications, audio streaming applications, gaming applications, news applications, book reading applications, or the like, any of which may send and receive data through the wireless connectivity 106, such as to download or upload audio, video, text, and/or images. GPU 104, DSP 108, and/or user interface 112 may be involved during the execution of applications to provide specialized functionality, such as with GPU 104 providing three-dimensional (3-D) rendering for games executing on the CPU 102. Applications executing on the SoC 150 may execute regardless of whether the apparatus 100 is in mission mode or testing mode and without being aware of the mode of operation for the apparatus 100. The testing mode may provide functionality to continue providing data to the applications such that applications continue to receive data when the apparatus 100 is configured in testing mode.

Diagnosing errors that occur during use of the wireless connectivity 106 to access wireless networks is difficult and time consuming. For example, testing and/or diagnosing the errors of the wireless connectivity 106 may involve placing the apparatus 100 in a specialized testing environment with specialized hardware that may be difficult to set and time consuming. However, in aspects of this disclosure, the memory 118 and/or other components of the SoC 150 may be used to provide on-chip testing of the wireless connectivity 106 and/or other functionality in the SoC 150 relating to communications with a wireless network. For example, the DSP 108 may be re-configured from mission mode to a testing mode to support simulation of one or more aspects of a wireless network. The testing module 120 may control the DSP 108 and cause the apparatus 100 to test the wireless connectivity 106 by simulating downlink communications and/or uplink communications with a network. For example, the testing module may provide simulated data and/or control information to memory 118 to be accessed by wireless connectivity 106. In some aspects, a HARQ buffer in the memory 118 may be used to store uplink data for a wireless network in a testing mode, but store uplink data for retransmission during mission mode. In some aspects, downlink control information (DCI) is determined to schedule decoding by the UE of simulated received data such that there is sufficient time to decode the data and generate hybrid automatic repeat request (HARQ) feedback during operation in the testing mode. For example, HARQ feedback are usually scheduled n+4 subframes after the transmission of the downlink data (at subframe n). In some aspects, the wireless connectivity 106 may be re-configured in the testing mode to read data from the memory 118 that simulates data that would be received through antenna 160. The simulated data read from memory 118 may be downlink data that was generated by a user application executing on the apparatus 100 such that a data loop is created. The loopback of the user's data may reduce the storage required for testing mode by reducing a need for storing simulated data for use in the testing mode. The testing mode functionality described with respect to SoC 150 may be used to provide testing of wireless connectivity 106 without use of specialized external testing equipment and without the unpredictability of transmissions on a real-world wireless network. A debug interface 142 may be provided to allow external component access to the apparatus 100 and/or external control over the apparatus 100, such as from a personal computer (PC).

The testing module 120 may be part of the SoC 150 and used to coordinate testing functionality, such as for controlling DSP 108 and/or wireless connectivity 106. SoC 150 may be referred to as a processor and include arrangements of logic circuitry and memory circuitry that collectively perform some operations and individually perform other operations. The testing module 120 may perform operations or cause the performance of operations relating to the testing mode described herein. For example, the test module may configure the SoC 150 to perform operations including generating downlink control information (DCI) of a first wireless network; generating, based at least in part on the DCI, uplink data; storing the uplink data in the memory; retrieving the uplink data from the memory for use as simulated downlink data of the first wireless network; processing the simulated downlink data; and/or evaluating the processing of the simulated downlink data.

Figure 2:
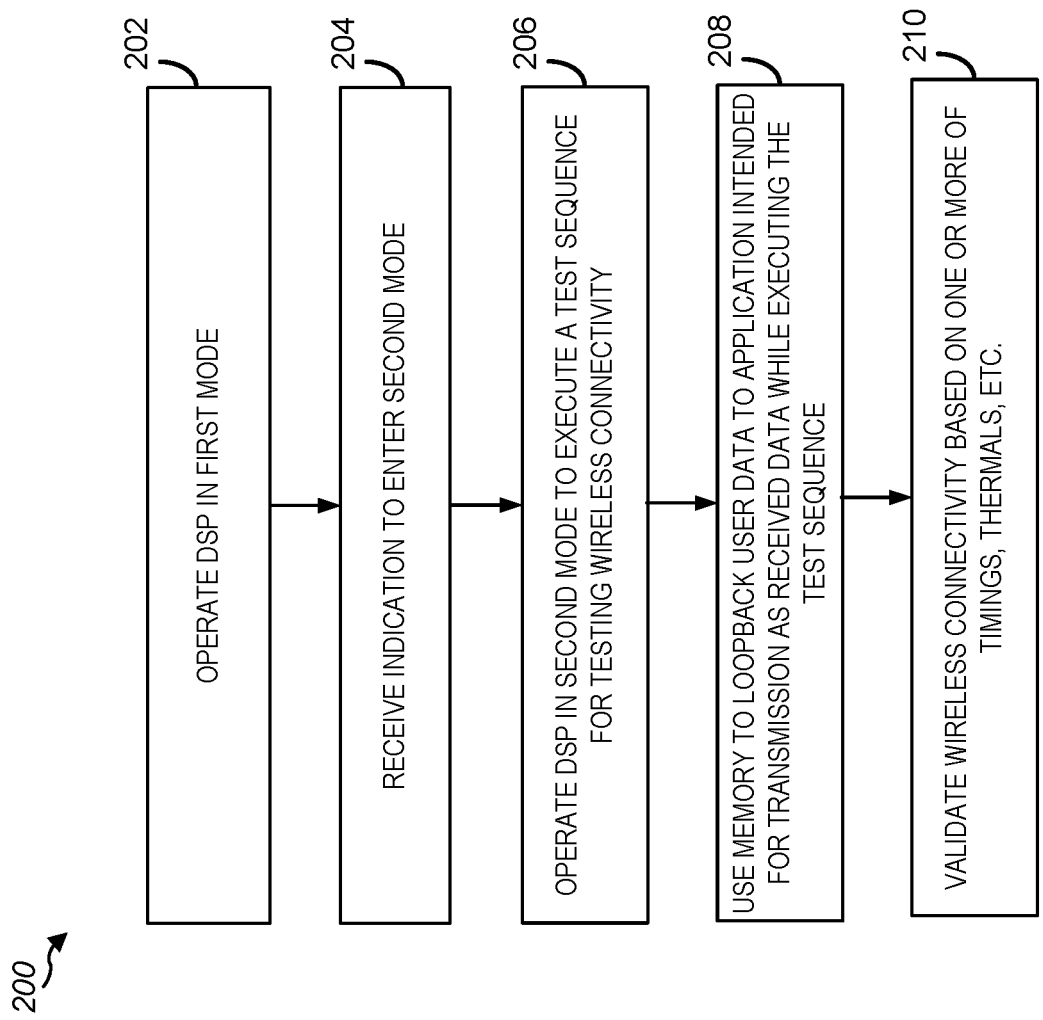
FIG. 2 is a flow chart illustrating a method for testing wireless functionality of a mobile device with simulation of wireless network communications according to one or more aspects.

An example method for operating a DSP of a mobile device for device testing is shown in FIG. 2. FIG. 2 is a flow chart illustrating a method for testing wireless functionality of a mobile device with on-chip simulation of wireless network communications according to one or more aspects. A method 200 begins at block 202 with operating the DSP in a first mode for mission mode operation of the mobile device. In the mission mode, the DSP may perform radio frequency filtering and signal conditioning at frequencies lower than the radio frequency (RF) that the signals are received at through the antenna, may provide coding and/or decoding of audio codecs used for performing voice calls on the wireless networks, and/or may generate wireless signals for transmission through the wireless connectivity and/or external RF circuitry, among other operations.

At block 204, an indication may be received to enter a second mode. One example indication may be an instruction from a user to enter the second mode, such as an indication based on user input to the apparatus. Another example indication may be an instruction from an operating system or firmware of the apparatus to enter the second mode. A further example indication may be an indication that a debug interface, such as USB interface to a personal computer (PC), is connected to the apparatus. The mobile device may enter a testing mode to verify design and/or operation of the mobile device. Also or alternatively, the testing mode may be used to identify and/or diagnose each hardware components and/or software implementation of the mobile device. For example, the testing mode may be entered when a user executes an application on the mobile device that sends a command to the DSP. Other indications for determining to enter the second mode may include a particular value entered into a register in the DSP and/or a jumper configured across one or more pins of circuitry coupled to the DSP. As a further example, the indication testing mode may include commands received over a debug interface from an external computing device and/or commands received from a remote server over a wireless interface. In some aspects with two available wireless networks, a command may be received over a first wireless interface to configure a second wireless interface in testing mode.

At block 206, the DSP is operated in a second mode, which provides the on-device testing. For example, the DSP may execute a test sequence for testing wireless connectivity. The test sequence may be retrieved from storage in firmware in the DSP and/or retrieved from a computer-readable medium or other memory coupled to the DSP, such as storage that is included on the SoC with the DSP. The test sequence may include, for example, messages that would be communicated to the mobile device over the wireless network, such that the DSP may provide the messages to the wireless connectivity to simulate at least one layer of the wireless network. One example message is a Downlink Control Indicator (DCI) message.

The DSP in testing mode may be used to simulate communications channels, including logical channels, transport channels, and/or physical channels in the downlink and/or uplink direction. For example, one or more logical channels functioning between the radio layer control (RLC) and media access control (MAC) layers may be simulated, including broadcast control channels (BCCH), paging control channels (PCCH), common control channels (CCCH), dedicated control channels (DCCH), and/or dedicated traffic channels (DTCH). As another example, one or more transport channels may be simulated, including broadcast channels (BCH), downlink shared channels (DL-SCH), paging channels (PCH), uplink shared channels (UL-SCH), and/or random access channels (RACH). As a further example, one or more physical channels reflecting actual signals on the air may be simulated, including physical broadcast channels (PBCH), physical downlink shared channels (PD-SCH), physical downlink control channels (PDCCH), physical random access channels (PRACH), physical uplink shared channels (PUSCH), and/or physical uplink control channels (PUCCHs). Test sequences executed by the DSP at block 206 may including simulation of the entirety of the wireless network, several layers of the wireless network, one layer of the wireless network, several channels across different layers of the wireless network, or an individual channel of one layer of the wireless network. Test sequences may include simulation of one or multiple wireless networks that may be of the same or different technologies, such as 4G LTE and 5G NR. When simulating parts of or the entirety of the wireless network, the DSP may provide signals to the wireless connectivity, such as through a shared memory. The wireless connectivity may read the signals from the memory and use the simulated signals in place of signals received through an antenna.

According to some aspects, one, two, three, some, or all layers of network processing within the UE may be tested in the testing mode. Thus, the testing mode may be used to isolate one or more layers by providing simulated network information to the isolated functions in individual layers. For example, layer 2 and/or layer 3 protocols of the UE 100 may operate separately in testing and/or mission mode. As another example, some modules (e.g., parts of the protocol layer or parts of firmware) may be operating in the testing mode, while other modules (e.g., other parts of the protocol layer or other parts of firmware) may be operating in a state connected to a physical network. As a further example, a downlink protocol layer and an uplink protocol layer may be operating separately in testing and/or mission mode. The uplink and/or downlink protocol layers in either testing and/or mission mode may support, e.g., downlink robust header compression (ROHC) and corresponding uplink ROHC, and/or downlink deflate and corresponding uplink deflate. The generation of simulated downlink data from the uplink data may allow detection of issues in the uplink protocol layer and/or the downlink protocol layer. As another example, for a given radio access technology (RAT), some modules may be running in the testing mode, while other modules may be running in the mission mode. Other RATs may be operating in different modes simultaneously and/or modules may be performing in testing mode for one RAT but in mission mode for another RAT. For example, when the apparatus supports multi-SIM operation, including NR RAT and LTE RAT, the apparatus can put a first SIM associated with the NR RAT in a testing mode, while the second SIM associated with the LTE RAT is in mission mode. The isolation may thus provide isolation between one or more 5G NR protocol layers and one or more 4G LTE protocol layers. In some embodiments, the service data adaptation protocol (SDAP) of the 5G NR protocol layers may be isolated and tested in simulation mode, such as to test Quality of Service (QoS) capabilities of the device.

According to some aspects, the testing mode may isolate certain functions of the wireless network for simulation. The wireless network operation may be divided into initial acquisition phase, RACH procedure phase, and RRC connected phase. The initial acquisition may be performed based on simulated test sequences in a testing mode or may be performed based on received transmissions in a mission mode. The RACH procedure may be performed based on simulated test sequences in a testing mode or may be performed based on received transmissions in a mission mode. The RRC connected phase may be performed in testing mode based on simulated test sequences and/or loopback of data from the uplink data path to the downlink data path, or in mission mode based on received transmissions. The downlink and uplink data paths in any of the phases may be separately configured in mission mode or testing mode. In some aspects, the uplink data path is always transmitting through a physical antenna regardless of phase or mode. In some aspects, a device may execute multiple layer stacks to simulate in testing mode and/or operate in mission mode on multiple wireless networks, which may or may not be of different radio access technologies (RATs), such as in a multi-SIM mode. Each of the stacks may be executing in a different phase and in different modes on the uplink and downlink data paths of the stacks. An abstraction layer may be used to handle different control techniques for different use cases. The abstraction layer may receive a configuration for a stack, such as a listing of combinations of RF bands for simulation within a particular stack to provide additional flexibility and reduce external testing equipment.

The signals may include predefined data as part of the on-chip testing. For example, audio, video, image, and/or text content may be stored for use during the testing. Such predefined data may be used to simulate, for example, video streaming through the simulated wireless network. Alternatively or additionally, the DSP may be configured to receive user input that can be used to generated simulated transmissions on a wireless network in accordance with the test sequence. The user input may specify particular content for simulated transmission. Still further, the DSP may be configured to loopback user input for on-chip testing. For example, at block 208, the network simulation may be continued by using the DSP to loopback user data to an application executing on the chip. The DSP may perform the user data loopback by configuring appropriate circuitry or software to read user data from memory in place of data received from a wireless network. In some aspects, a video call testing application may execute on a CPU coupled to the DSP. The DSP may receive the video content from a video call and loopback the video content as one or more other participants in the video call. This loopback allows for real-time generation of content for use during on-chip testing. Compared to the use of predetermined data for on-chip testing, or when used to supplement predetermined data for on-chip testing, the loopback of user input at block 208 may reduce an amount of storage used for providing on-chip testing functionality. A video application executed by the user may generate high-definition (HD) video data, such as from a video call application, artificial reality (AR) application, live streaming application, camera application, and/or rendered video game application may generate a high bandwidth data stream that is suitable for testing of wide bandwidth communications networks, such as networks employing carrier aggregation (CA) to combine multiple carriers or multiple bandwidth parts (BWPs).

At block 210, the DSP may monitor operation of the wireless connectivity during the testing mode to evaluate performance of the wireless connectivity. For example, the DSP may validate wireless connectivity based on one or more of testing logs, timing measurements of operations on the simulated wireless network, thermal measurements of the mobile device during operations on the simulated wireless network, power measurements of the mobile device during operations on the simulated wireless network, and/or other characteristics of the mobile device during operations on the simulated wireless network. The DSP may generate diagnostics information and/or a report for display to a user of the mobile device or transmission to another user. Validation may include validation of DL Aggregation (combining 5G and LTE downlink data), UL aggregation (combining 5G and LTE uplink data), carrier aggregation on both 5G and 4G, 5G dual connectivity, and/or transmission power monitoring in a SMART TX transmission.

Figure 3:
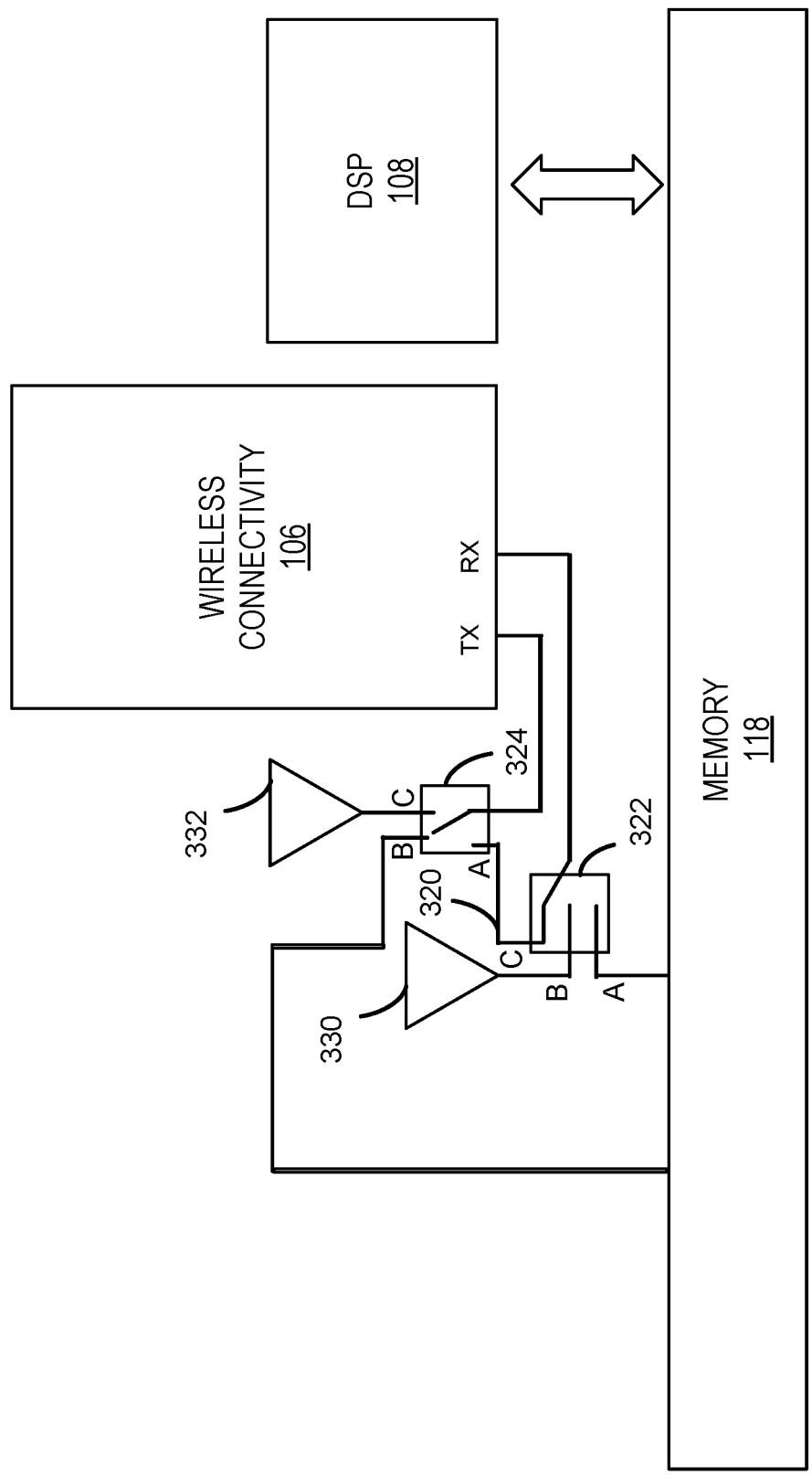
FIG. 3 is a block diagram illustrating a configuration supporting loopback during wireless network simulation for testing of a mobile device according to one or more aspects.

As described above, one method of generating data for use in a simulated wireless network is loopback of data from a user during operation of the wireless device. FIG. 3 is a block diagram illustrating a configuration supporting loopback during on-chip wireless network simulation for testing of a mobile device according to one or more aspects. Wireless connectivity 106 may include a transmit (TX) port and a receive (RX) port. The TX and RX ports may be configurable for different modes of operation, such as the two mobile device modes described with reference to FIG. 2. The configuration may be accomplished by changing the source for the receive RX port and/or the destination for the transmit TX port. The source and/or destination may be changed through switches 322 and 324, respectively, that change the signal path into and out of the TX and RX ports of wireless connectivity 106.

The switch 322 may have three ports allowing for three different configurations at the receive (RX) input for wireless connectivity 106. The switch 322 may be configured to couple signals from antenna 330 at port B to the RX input during a first mode, such as a mission mode, for operation on a wireless network, such as a physical wireless network or an externally simulated wireless network. The switch 322 may configure to couple the memory 118 at port A to the receive RX input during a second mode, such as a testing mode. In the testing mode, wireless connectivity 106 receives messages, data, control signals, or other signals from the memory 118, such as signals generated by DSP 108. The switch 322 may configure to couple the transmit (TX) output of wireless connectivity 106 at port C to the RX input. The data path from the TX output through the switch 322 to the RX input source may be configured to add a predetermined signal delay, in which the signal delay is approximately a delay expected in receiving data from an operating wireless network. Although three ports on switch 322 are shown, there may be additional inputs available in some aspects of the switch 322 to provide additional input sources for wireless connectivity 106. In some aspects, the switch 322 may also perform combining operations to combine portions of the input ports A, B, and/or C for output to the RX input of wireless connectivity 106.

The switch 324 may have three ports allowing for three different configurations at the transmit (TX) output for wireless connectivity 106. The switch 324 may be configured to couple signals from antenna 332 at port C to the TX output during a first mode, such as a mission mode, for operation on a wireless network, such as a real-world wireless network or an externally simulated wireless network. The switch 324 may configure to couple the switch 322 at port A to the transmit TX output during a second mode, such as a testing mode, to convey signals from the wireless connectivity 106 to a feedback path 320 to loopback the signals for transmission through the switch 322 to the receive RX input of wireless connectivity 106. In one or more aspects, the transmitted signals may be transmitted through antenna 332 for transmission in a wireless network in addition to the loopback to the wireless connectivity 106.

The switch 324 may also configure to couple the switch 322 at port A to the memory 118, to allow saving of generated uplink (UL) data for debugging purposes and/or to loopback the user data through port A at the switch 322 to the RX input of wireless connectivity 106. In some aspects, the switch 324 may connect multiple outputs, such as one of port A and port B simultaneously with port C to allow transmission of the data on the physical network in addition to looping back data for generating simulated downlink data.

Figure 4:
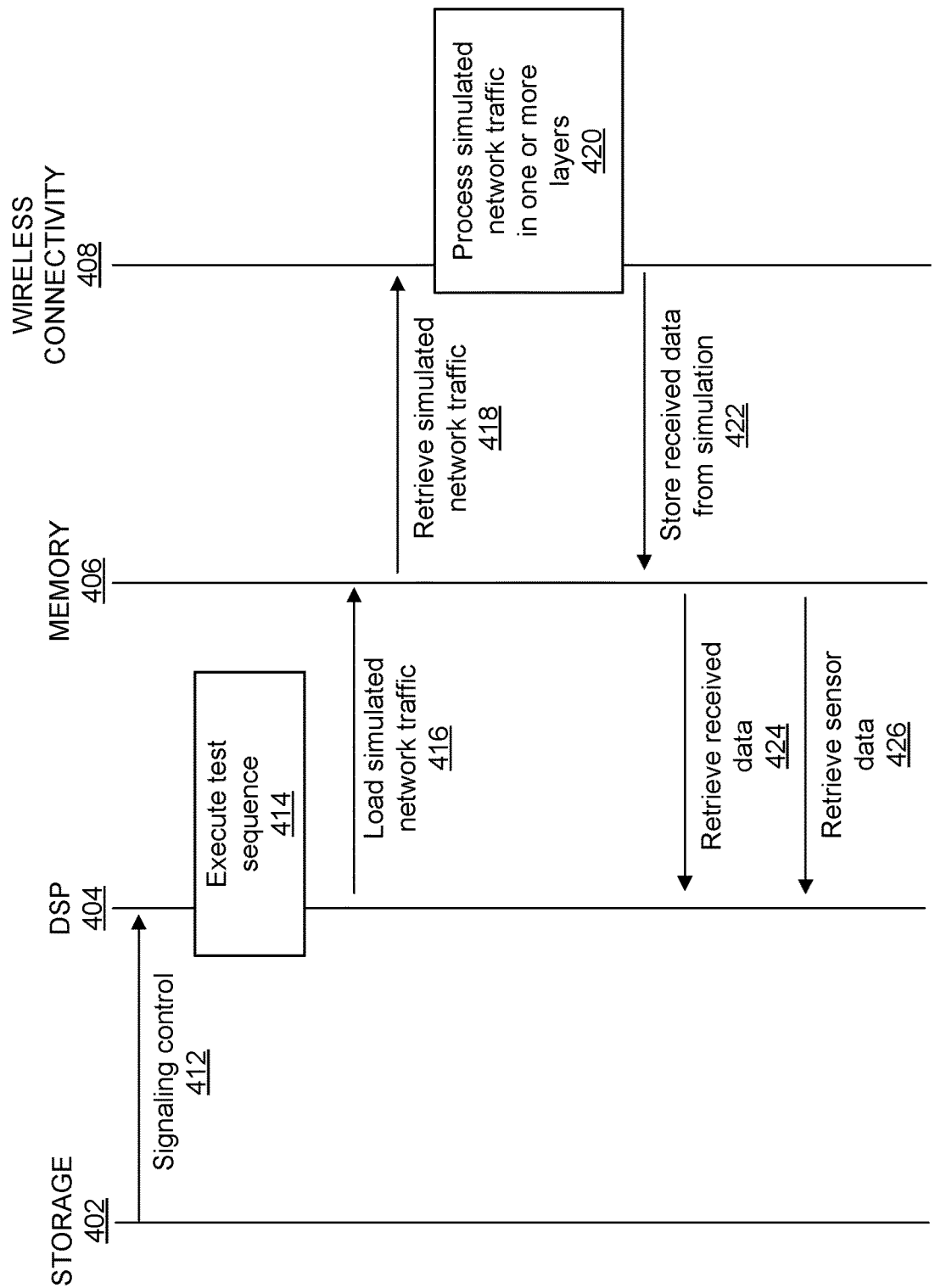
FIG. 4 is a call flow diagram illustrating a process of initiating a on wireless communication network simulation according to one or more aspects.

Interaction of some of the components in a mobile device in an on-chip testing mode in an example aspect of the disclosure is shown in FIG. 4. FIG. 4 is a call flow diagram illustrating a process of initiating an on-device wireless communication network simulation according to one or more aspects. Storage 402 may store test sequences, sample data, sample messages, and/or data structure definitions that make up signaling control for a wireless network. DSP 404 may retrieve control signaling 412 as part of performing an on-chip test. Although DSP 404 is shown retrieving signaling control from storage 402, retrieval from storage may also include retrieval from another memory device, such as memory 406. The DSP 404 may retrieve portions of the stored signaling control based on a configuration for the on-chip network simulation, such as whether one or several layers are configured for simulation or whether one or multiple network technologies are configured for simulation. For example, the DSP 404 may retrieve signaling control from storage 402 for operations performed using wireless connectivity 408 in testing mode and from a physical network for operations performed using wireless connectivity 408 in mission mode. The DSP 404 may execute 414 a test sequence based on the retrieved signaling control. The execution may result in generation of simulated network traffic made up of signals to conveying to the wireless connectivity. The generated network traffic may be loaded 416 into memory 406 as the simulated network traffic. In the on-chip testing mode, wireless connectivity 408 may be configured to ignore signals retrieved over an antenna and instead to process signals retrieved from memory 406. For example, the wireless connectivity 408 may retrieve 418 simulated network traffic from memory 406. In some aspects, the simulated network traffic may be retrieved and stored in a hybrid automatic repeat request (hybrid ARQ or HARQ) transmission buffer of the wireless connectivity 408 for processing 420. The wireless connectivity 408 may process 420 the simulated network traffic in one or more layers, and the results stored 422 in memory 406. The DSP 404 may retrieve 424 the received data and perform validation or other analysis on the received data 422 as part of evaluating the processing of the simulated downlink data.

The DSP 404 may also retrieve 426 sensor data that is correlated with the processing 420 of simulated network traffic. For example, the DSP 404 may retrieve 426 temperature sensor data regarding the wireless connectivity 408 correlated to the processing 420 to analyze thermal and/or power characteristics of the mobile device while operating on a wireless network. As another example, the DSP 404 may retrieve 426 power usage data regarding the wireless connectivity 408 and/or the DSP 404 correlated to the processing 420 to analyze power consumption characteristics of the mobile device while operating on a wireless network. The power usage data may include current consumption on a transmit TX power rail and/or a receive RX power rail. The power usage data may also or alternatively include power consumption for other components within the mobile device, such as components of the SoC 150. The received data 424 and sensor data 426 may be saved to other memory for longer-term storage and/or transmitted to a remote location, such as a base station (BS) or a remote cloud-based server. This export of the data may allow further off-line analysis of the performance of wireless connectivity 408 and other components in the apparatus.

The results of the evaluating of the wireless connectivity 106 and/or evaluating of the DSP 108 may be used for determining a configuration of an apparatus, such as a user equipment (UE) or base station (BS). For example, the apparatus may be configured to communicate over the wireless network based, at least in part, on one or more predetermined parameters. During testing mode, the operation of the apparatus with the predetermined parameters is evaluated and data collected during the testing mode and/or the evaluations may be used in training a machine learning algorithm. The machine learning algorithm may be used to determine, such by updating, the one or more predetermined parameters. Machine learning models, as described herein, may include logistic regression techniques, linear discriminant analysis, linear regression analysis, artificial neural networks, machine learning classifier algorithms, or classification/regression trees in some embodiments. In some aspects, the machine learning may include one or more artificial neural networks, which may include an interconnected group of artificial neurons (e.g., neuron models) for modeling relationships between parameters, such as disparity and scene depth. In some aspects, the machine learning may include one or more convolutional neural networks, which are a type of feed-forward artificial neural network. Convolutional neural networks may include collections of neurons that each have a receptive field and that collectively tile an input space. In some aspects, the machine learning may include one or more deep learning architectures, such as deep belief networks and deep convolutional networks, which are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features. In various aspects, machine learning systems may employ Naïve Bayes predictive modeling analysis of several varieties, learning vector quantization, or implementation of boosting algorithms such as Adaboost or stochastic gradient boosting systems for iteratively updating weighting to train a machine learning classifier to determine a relationship between an influencing attribute, such as one of the predetermined parameters, and an outcome, such as chip temperatures, and/or a degree to which such an influencing attribute affects the outcome of such a system.

Figure 5:
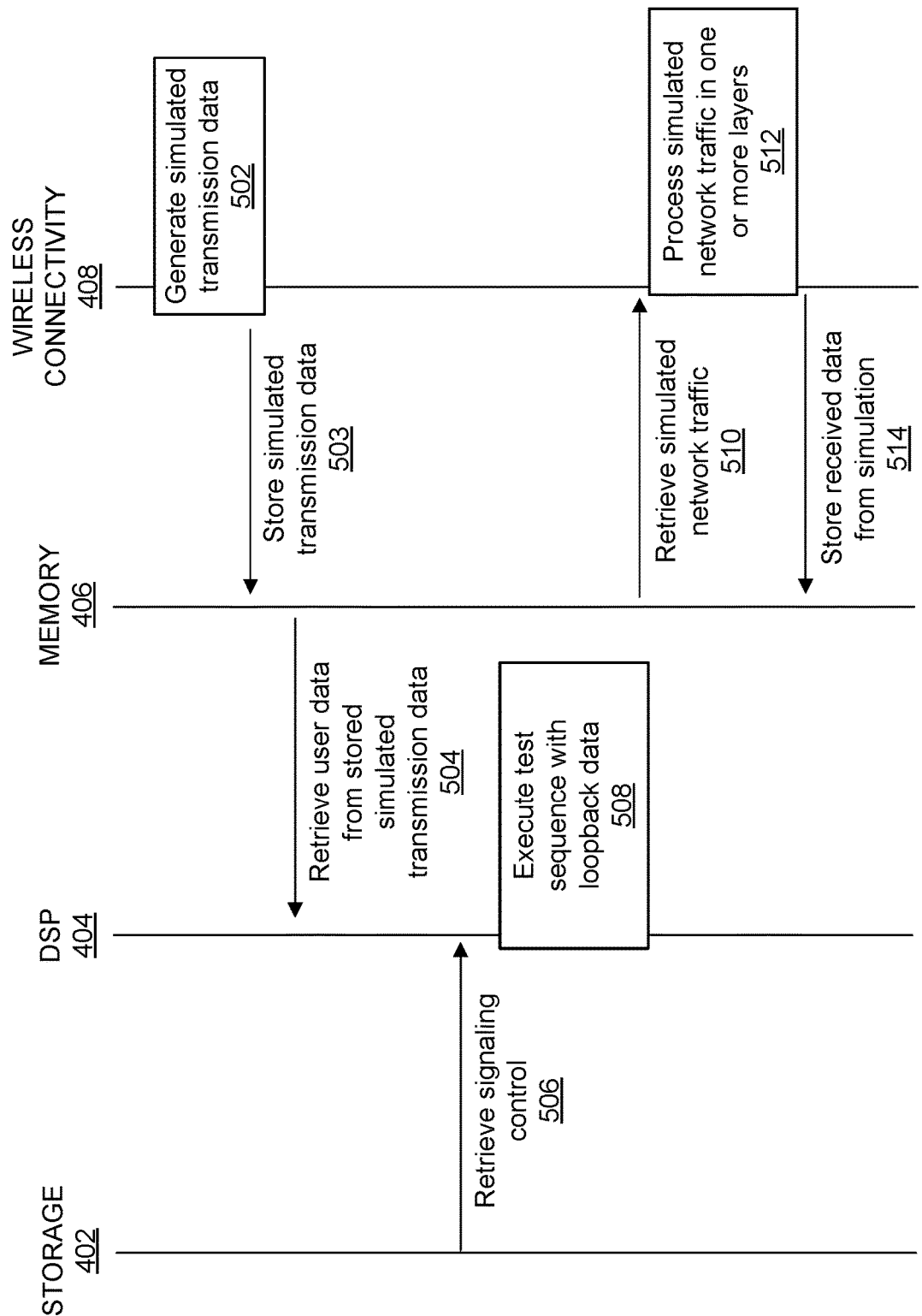
FIG. 5 is a call flow diagram illustrating a process for incorporating user loopback data during a wireless communication network simulation according to one or more aspects.

The wireless network simulation may include loopback data from a user application executing on the mobile device to test the connectivity circuit. FIG. 5 is a call flow diagram illustrating a process for incorporating user loopback data during an on-chip wireless communication network simulation according to one or more aspects. Wireless connectivity 408 may generate 502 simulated transmission data, such as by processing user data received from a higher-layer application, and store 503 the simulated transmission data in memory 406. The data received during the simulation may include content, such as video data, generated by a user during execution of an application, such as a video call application, on the mobile device. The DSP 404 may retrieve 504 the user data from the stored simulated transmission data. The DSP 404 may retrieve 506 signaling control from storage 402 and apply the user data when executing 508 the test sequence. The wireless connectivity 408 retrieves 510 the simulated network traffic that includes the loopback data, processes 512 the simulated network traffic in one or more layers, and stores 514 received data from the simulation in memory 406. In the example of a video call application, the outgoing user video may be looped back through a feedback path and used as simulated incoming participant video that is processed by the wireless connectivity 408. The resulting video call in the application of the mobile device appears with a participant's video showing as a time delayed version of the user's video. Another example of uplink data for use as simulated downlink data is an ICMP request message. The application may be a sender that generates a ping request, and normally a responder would generate a corresponding ICMP reply message. The IP address of the request message may be switched between the destination and source fields, as in the example of the video call, such that the apparatus receives downlink data that appears as an ICMP request to the UE from a different network terminal. In some embodiments, the switching may include replacing the destination field with the source field and using a different value for the source field in the simulated downlink data.

Further processing may occur on the simulated network data, such as during the writing of the uplink data in memory, during the storage of the uplink data in memory, and/or during the retrieving of the uplink data from memory. For example, the ICMP request may include a checksum field, which is recomputed after switching the source and destination addresses such that the ICMP request is a valid request.

Figure 6A:
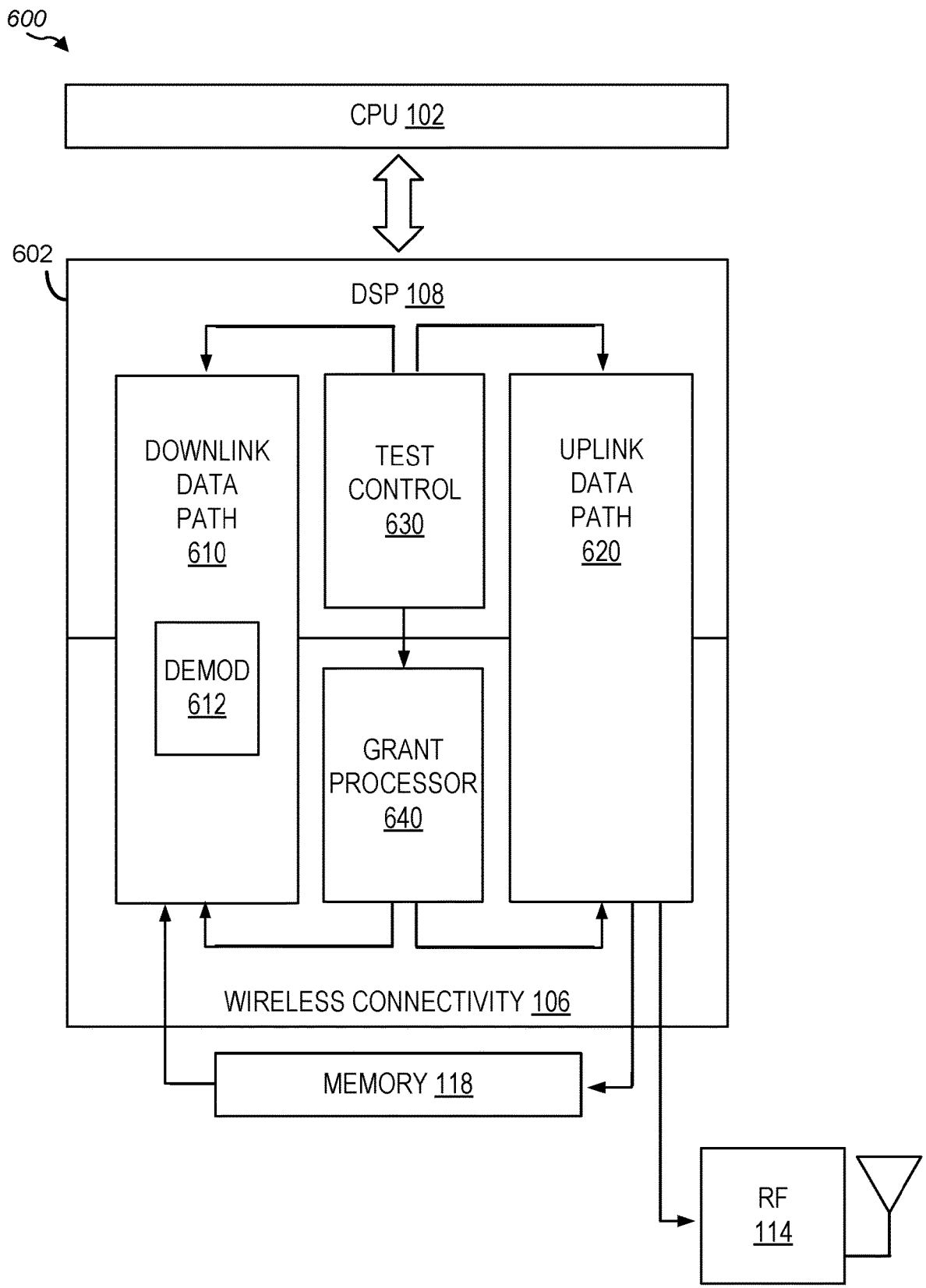
FIG. 6A is a block diagram illustrating a system for configuring wireless connectivity for a testing mode according to some aspects.

The configuration of a UE for the loopback of data from uplink data path to downlink data path inside a processor is shown in FIG. 6A. FIG. 6A is a block diagram illustrating a system for controlling wireless connectivity for a testing mode according to some aspects. A system 600 includes a system on chip (SoC) processor 602 with a downlink (DL) data path 610 and an uplink (UL) data path 620. The UL data path 620 may include hardware and/or software components in wireless connectivity 106 and/or in DSP 108. The DL data path 610 may include hardware components in wireless connectivity 106 and/or software modules executing in DSP 108. A test control module 630 executing in DSP 108 may control the operation of processor 602 to enter or exit a testing mode and configure and execute the testing mode.

The test control module 630 may be configured to control software modules executing in the DL data path 610 and/or the UL data path 620, such as to switch control of the processing of data from a configuration appropriate for a simulated wireless network to a configuration for an operational wireless network. For example, the grant processor 640 may configure a demodulator block 612 of the DL data path 610 to ignore received data from RF circuitry and instead to receive and process data from memory 118. As another example, UL DCI-based TB size may be provided to an over-the-air/encoder chain and move another TB of size corresponding to DL grant back to UE for DL to pick up. The UL and DL grants may have different TB sizes. If the UL grant is smaller than the DL grant, the actual TB bits in memory may be moved in order to match the determined UL grant and the DL grant. In some aspects, the UL data path 620 and the DL data path 610 may be configured in different modes, such as when the UL data path 620 is in mission mode and the DL data path 610 is in testing mode. In some aspects, each RF band in operation on the processor 602 may be in a different mode, such as when Band 1 is in mission mode and Band 2 is in testing mode. In some aspects, different bands of the DL data path 610 and the UL data path 620 may be configured in different modes, such as when Band 1 of the DL data path 610 and Band 2 of the UL data path 620 are in mission mode when Band 2 of the DL data path 610 and Band 1 of the UL data path 620 are in testing mode. In some aspects, the test control module 630 may be configured to activate an auto-ACK mode, such as when the UL data path 620 is in the mission mode, in which the UL data is transmitted over the air but no base station is receiving the UL data and therefore not providing acknowledgements/negatic acknowledgements (ACKs/NACKs) to the apparatus. In auto-ACK mode, the apparatus would automatically generate ACKs/NACKs (e.g., independent of any ACK/NACK or other transmissions received from the first wireless network) to any layers or components that need ACK/NACK feedback (e.g., user applications, such as video calls, or other applications executing on the CPU 102) in order to keep the DL data path 610 processing data.

The test control module 630 may also be configured to control a grant processor 640 of the wireless connectivity 106 to switch on or off the generation of grants and/or other control signals for operating on the simulated wireless network. The grant processor 640 may be configured to control the wireless connectivity 106 to enter or exit a testing mode, switch between testing mode and mission mode for certain components of wireless connectivity 106, and/or configure parameters of the testing mode in accordance with commands the grant processor 640 receives from the test control module 630. For example, the grant processor 640 may activate certain hardware features within wireless connectivity 106 to write data to a memory from the uplink data path that can be accessed by the downlink data path. In a testing mode, the grant processor 640 may generate control signaling for simulating aspects of or an entirety of a wireless network. For example, the testing mode simulation may include control signaling to enable an end-to-end call flow to exist from the UL data path 620 through the memory 118 to the DL data path 610 such that the processor 602 is allowed to operate according to a wireless standard specification without modification of how the data is processed. That is, the processor 602 may be configured to process loopback data from the memory 118 without changing how the processor 602 substantively processes data in a non-testing mode.

One example control signaling that may be generated by the grant processor 640 is simulated resource allocations for uplink and downlink scheduling information for the simulated wireless network. For example, the grant processor 640 may generate one or more downlink control information (DCI) messages. The DCI may indicate an uplink resource allocation for the uplink data path 620 to use when determining uplink data for output to the memory 118 and/or the RF circuitry 114. The DCI may also or alternatively indicate resources for receiving downlink (DL) data for the DL data path 610. For example, the DL data may be retrieved from the memory 118.

Another example control signaling that may be generated by the grant processor 640 is an acquisition success message. During operation of the processor 602 in testing mode, acquisition fail messages may be generated due to disconnection of the DL data path 610 from RF circuitry 114 communicating with an operational wireless network. The grant processor 640 may provide an acquisition success message to components within the DL data path 610 such that the components may enter a state corresponding to an active call on the simulated wireless network. The grant processor 640 overriding certain control operations in the processor 602 may reduce the burden on the grant processor 640 and/or test control module 630 by reducing a number of aspects of the wireless network that must be simulated, while still supporting testing of the UE. That is, by overriding the acquisition failure determination with an acquisition success message, the test control module 630 and/or the grant processor 640 do not need to simulate pilot signals and corresponding signally relating to establishing a presence on a wireless network through cell searching and/or cell selection operations. Reducing the amount of processing performed by the test control module 630 and/or the grant processor 640 as part of the testing mode reduces the amount of additional circuitry embedded in processor 602 and/or program code executed by the processor 602, which reduces size and cost of the processor 602. Further, reducing the number of operations performed by the processor 602 may reduce power consumption, which may be beneficial when the processor 602 is part of a mobile device.

The processing by the processor 602 may also or alternatively be reduced by generating downlink data in the testing mode for the DL data path 610 from the data generated via the UL data path 620. In this loopback operation, symmetry of uplink data in the UL data path 620 to downlink data in the DL data path 610 in some wireless networks may be taken advantage of to reduce processing by the processor 602 in testing mode. The UL data output from the UL data path 620 may be stored in memory 118 with limited reformatting to allow the data to be retrieved from memory 118 by DL data path 610. For example, the UL data may be stored in memory 118 in a format in accordance with simulated DCI grants generated by the grant processor 640. The storage in accordance with the simulated DCI grants through limited reformatting may include resizing transmission blocks (TBs) from a transmission block intended for transmission over an antenna. The limited reformatting may also include switching source and destination addresses in the content. In some aspects, the limited reformatting may include other modifications of the data without substantively changing the contents of the data. The limited reformatting may be performed by DSP 108, wireless connectivity 106, and/or other circuitry of the apparatus.

In some aspects, the grant processor 640 may adjust simulated DL grants provided in DCI based on what data is being sent through the UL data path 620. For example, as an amount of data transmitted through the UL data path 620 increases or decreases then the grant processor 640 may adjust resource allocation in the simulated DL grants. As another example, timing of the simulating DL grants may be adjusted based on timing of data traversing the UL data path 620. Simulated downlink grants in the simulated DCI information may be timed to allow the arrival of data from the UL data path 620 or another predetermined amount. A predetermined number of slots of delay may be configured for downlink resource allocations from the UL data path 620. The predetermined number of slots may be configurable between predetermined values based on a type of the simulated network. For example, a first predetermined number of slots may be used when simulating a 5G sub-6 network, a second predetermined number of slots may be used when simulating a 5G mmWave network, and/or a third predetermined number of slots may be used when simulating a 4G LTE network. In some aspects, the predetermined number of slots may be based on numerology within the simulated network.

Generation of various control signals is described above along with the loopback of uplink data for input to the DL data path, however data may alternatively be retrieved from a wireless network as part of the testing. For example, DL data may be received from RF circuitry 114, but DCI messages simulated by the processor 602 for processing the DL data. This may be performed by ignoring PDCCH grants and ignoring CCH control channel processing and decoding the received signals according to control signals generated by grant processor 640.

The testing mode for the processor 602 may be activated through an external interface, such as a general-purpose interface, a debug interface, and/or a dedicated test interface. The interface may receive commands regarding testing mode configurations from the CPU 102 through an interface, such as a Universal Serial Bus (USB) interface. In some aspects, the CPU 102 may be embedded in an integrated circuit (IC) sharing a substrate with the process 602. In some aspects, the CPU 102 may be a component external from the processor 602 and coupled to the wireless transceiver through conductors in a printed circuit board (PCB). In some aspects, the CPU 102 may be a component located external from a user equipment (UE) device having the processor 602, such as with the CPU 102 part of a computing system communicating with a UE having the processor 602.

Figure 6B:
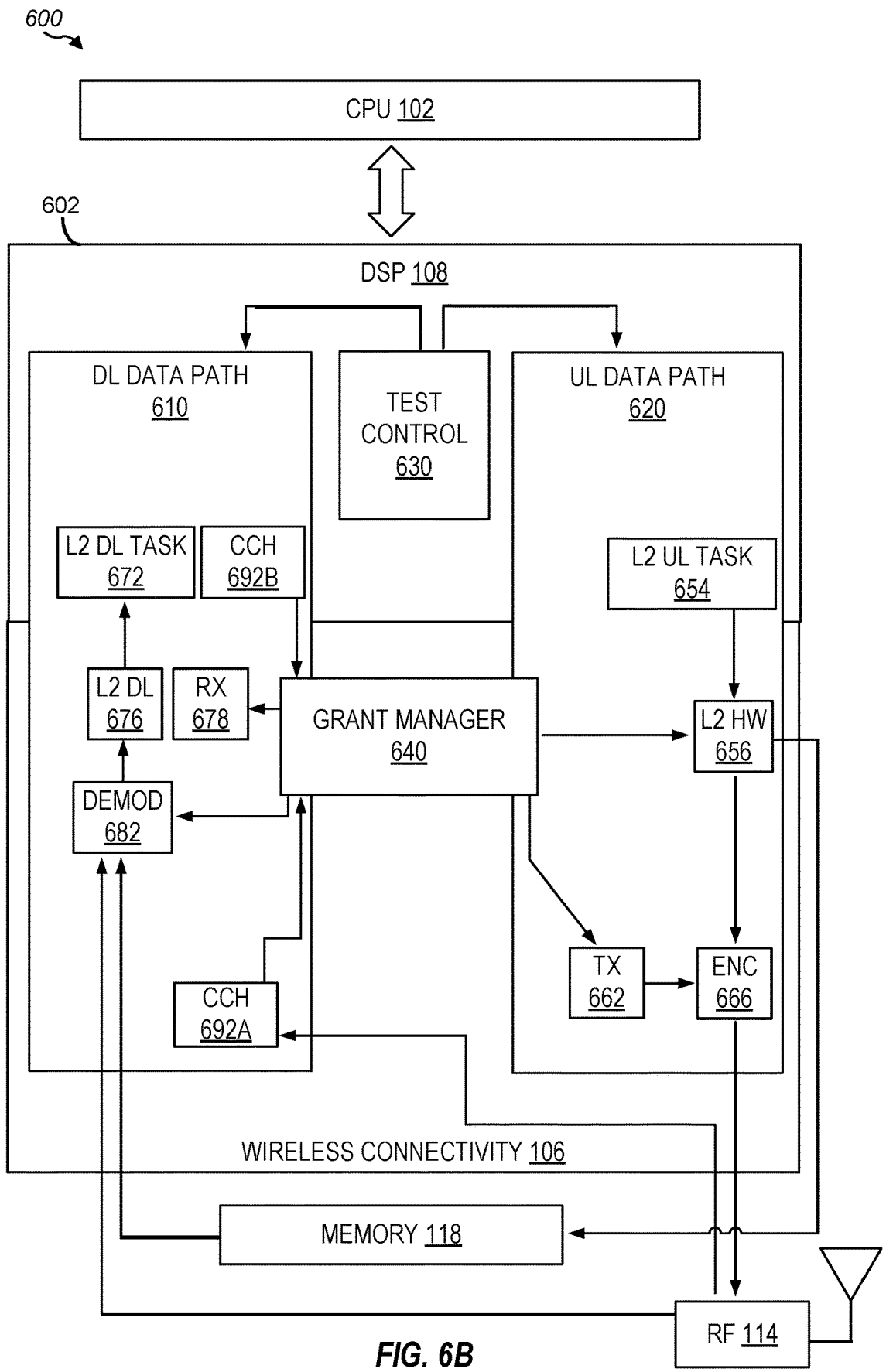
FIG. 6B is a block diagram illustrating a system for configuring uplink and downlink paths according to some aspects.

One aspect of configuring the DL data path 610 and UL data path 620 between different modes, such as testing mode and mission mode, is shown in FIG. 6B. FIG. 6B is a block diagram illustrating a system for controlling uplink and downlink paths according to some aspects. The UL data path 620 may receive user data for UL transmission at L2 UL task 654 executing in DSP 108. The L2 UL task 654 passes the user data to L2 HW 656 in the wireless connectivity 106. The L2 HW 656 is configured, such as by test control 630, in a testing mode to activate an output path to memory 118 for outputting formatted user data for loopback. The L2 HW 656 may also provide formatted data to encoder 666 for transmission on a physical antenna in accordance with control from transmission TX block 662, which may configure, for example, the encoder 666 for certain modulation, RF bands, carrier aggregation, TB sizes, automatic gain control (AGC), etc. The L2 HW 656 may execute, for example, a scatter-gather from memory 118 to form a contiguous block of data for transmission based on grants provided by grant processor 640. The grant processor 640 coordinates operations in the UL data path 620 such that the user data is appropriately formatted for transmission on the wireless network in accordance with the configuration of the wireless network and UL grants. The encoder 666 couples to the RF circuitry 114 to control the generation of RF signals for output to an antenna.

The DL data path 610 may obtain DL data for processing by DSP 108 and/or wireless connectivity 106. The obtained DL data may be received DL data from an antenna through RF circuitry 114 when in mission mode, loopback user data from memory 118 when in testing mode, and/or a combination of the two when configured to operate in both mission mode and testing mode on, e.g., different wireless networks, bands, or layers. Wireless connectivity 106 may include components for processing DL data, including demodulator 682, received RX block 678, L2 DL HW block 676, and/or L2 DL Task 672. The demodulator 682 retrieves, in testing mode, DL data from memory 118. The grant processor 640 may control the decoding of DL data at demodulator 682. The L2 DL Task 672 receives partially-decoded data from the L2 DL HW block 676, which further processes the output of demodulator 682, and passes the data to other blocks of the DSP 108 and/or a CPU 102 for further processing. In some aspects, portions of the demodulator 682 may be turned off in testing mode. The decoded DL data may be evaluated by test control 630 to determine whether the processing performed by wireless connectivity 106 and/ or DSP 108 met certain criteria established for a particular test executing while in testing mode. For example, the test control 630 may evaluate the decoded DL data to determine that the data was correctly decoded by comparing to the original user data that was input to the UL data path 620. The test control 630 may also collect sensor data regarding parameters, such as temperatures within the apparatus, during the execution of the testing mode. The evaluations of the processing and/or logs regarding the processing may be communicated to CPU 102, such as through a debug interface, written to non-volatile memory, and/or transmitted to a remote server through RF circuitry 114 or other network connectivity of the apparatus.

The decoding in the DL data path 610 may be performed in accordance with DL grants received from the physical wireless network over the air or generated from wireless network simulations. In mission mode, a control block CCH 692A may receive signals from RF circuitry 114 and process DL grant information that is provided to grant processor 640. Grant processor 640 then controls demodulator 682 and receive RX block 678 in accordance with received DL grants. For example, grant processor 640 may control RX block 678 to configure for upcoming activity. Grant processor 640 may also control L2 HW block 656 and TX block 662 in accordance with received UL grants received over RF circuitry 114 and processed through CCH block 692A. In testing mode, a control CCH block 692B may generate simulated DL grants, such as in accordance with a test sequence executed by test control 630. The grant processor 640 may receive simulated DL grants from CCH block 692B and control RX block 678, demodulator 682, L2 HW block 656, and/or TX block 662 in accordance with the simulated grants. In some aspects, grant processor 640 may receive grants from CCH block 692A and CCH block 692B and control aspects of the DL data path 610 and UL data path 620 differently depending on configuration of which aspects of a wireless network are simulated.

Figure 7:
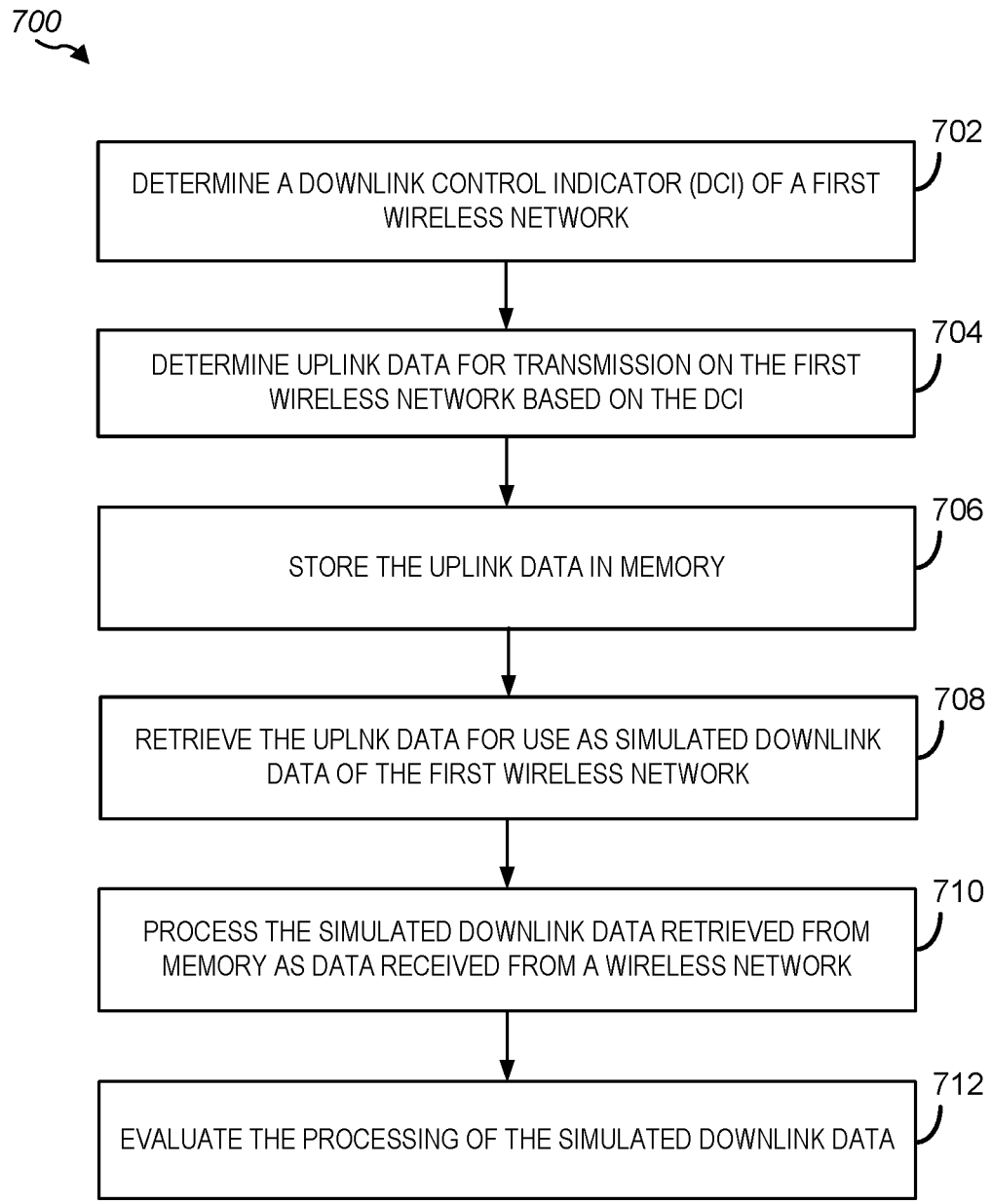
FIG. 7 is a flow chart illustrating a method for testing a device using loopback through memory according to some aspects.

A method 700 of operating aspects of a user equipment for device testing is described with reference to FIG. 7. FIG. 7 is a flow chart illustrating a method for testing a device using loopback through memory according to some aspects. At block 702, downlink control information (DCI) for a first wireless network is determined. The DCI may be determined, for example, by grant processor 640 of FIG. 6A or 6B or other blocks of wireless connectivity 106 and provided to blocks of a UE or BS to schedule processing of the uplink data. At block 704, uplink data for transmission on the first wireless network is determined based on the DCI. The user data may be determined, for example, by CPU 102 of FIG. 1 executing an application, and that user data received and formatted for transmission by L2 HW 656 or other blocks of wireless connectivity 106. At block 706, the uplink data is stored in memory for use as simulated downlink data. The storage may be performed by, for example, L2 HW 656 of wireless connectivity 106. At block 708, the simulated downlink data is retrieved from memory for use as simulated downlink data. The retrieval may be performed by, for example, DB-LLC of wireless connectivity 106, a demodulator 612 of wireless connectivity 106, or other components of wireless connectivity 106. At block 710, the simulated downlink data is processed as though the simulated downlink data was retrieved from a wireless network. The DL processing may be performed by one or a combination of components in wireless connectivity 106 and/or DSP 108, including one or more of blocks illustrated in FIG. 6A or 6B. At block 712, the processing of block 710 of the simulated downlink data is evaluated, such as for validation for operation on wireless networks such as by determining compliance with one or more aspects of a wireless standard and/or for evaluation of thermal and power performance of the processor, including a DSP, performing the processing at block 710.

Figure 8:
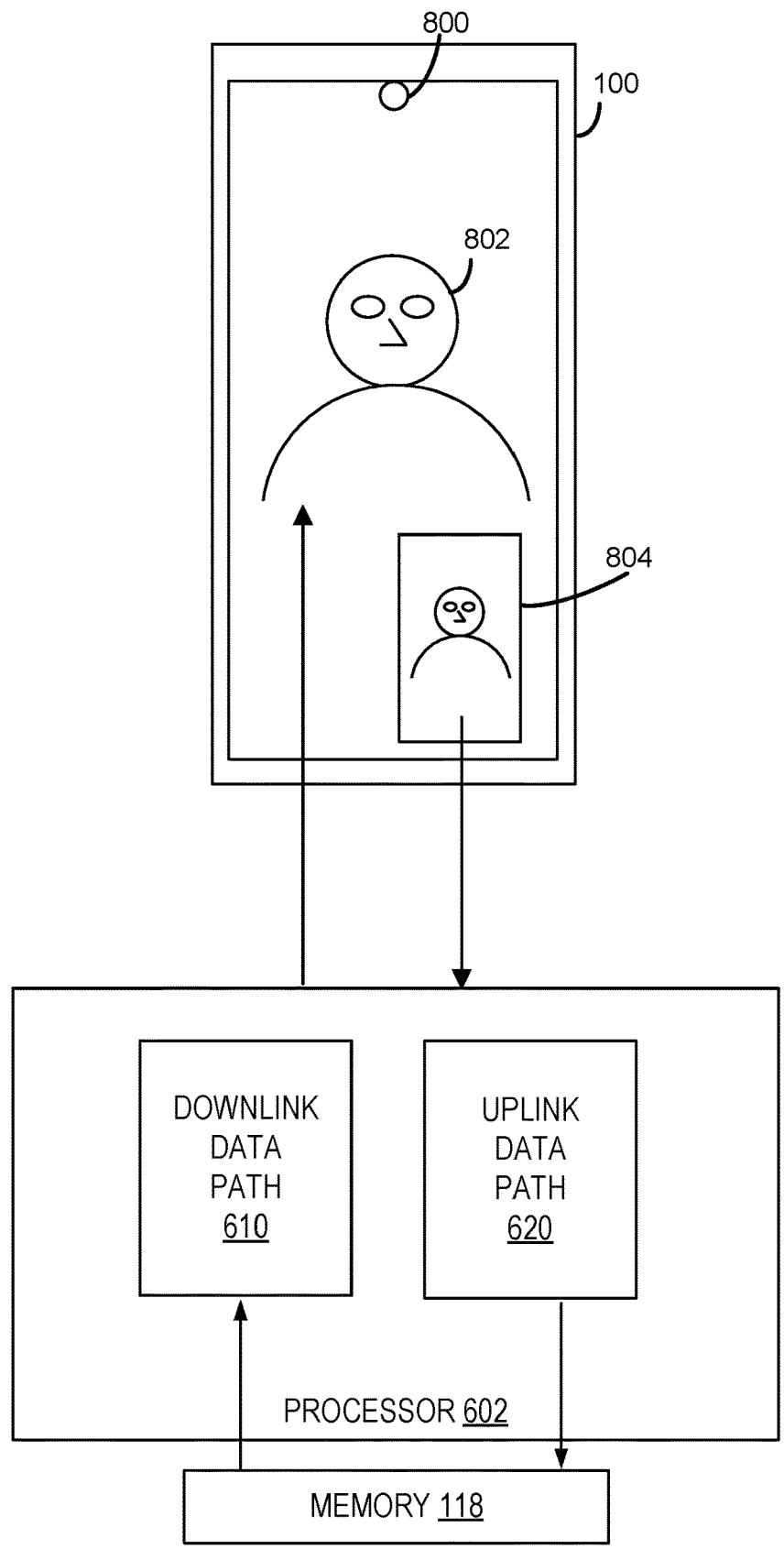
FIG. 8 is an illustration of a video call application executing in a testing mode of a user equipment according to some aspects.

The testing mode described in the method 700 and other aspects disclosed herein may be used to complete an end-to-end call, such as a video call. FIG. 8 is an illustration of a video call application executing in a testing mode of a user equipment according to some aspects. A video call application executing on user equipment 100 may use a camera 800 to generate a view 804 of the user that is displayed on the UE 100. The video data of the view 804 is intended for transmission to another user in the video call. The application thus transmits the view 804 to UL data path 620 of processor 602, which processes the data for transmission on a wireless network. In a testing mode, the processor 602 is configured to receive the video data for view 804, package the video data as the uplink data, and store the uplink data in memory 118. The processor 602 inputs the uplink data to the DL data path 610 with appropriate processing, such as switching of source and destination addresses. The DL data path 610 processes the uplink data as simulated downlink data to generate view 802 of a user, which is displayed on a screen of the UE 100. The view 802 may be a delayed version of the view 804 because of the loopback through the memory 118.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The $3^{rd}$ Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UNITS/GSM network. Additionally, an operator network may also include one or more LTE networks, or one or more other networks.

The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UNITS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles and will be referred to herein as "sub-6 GHz". A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

Figure 9:
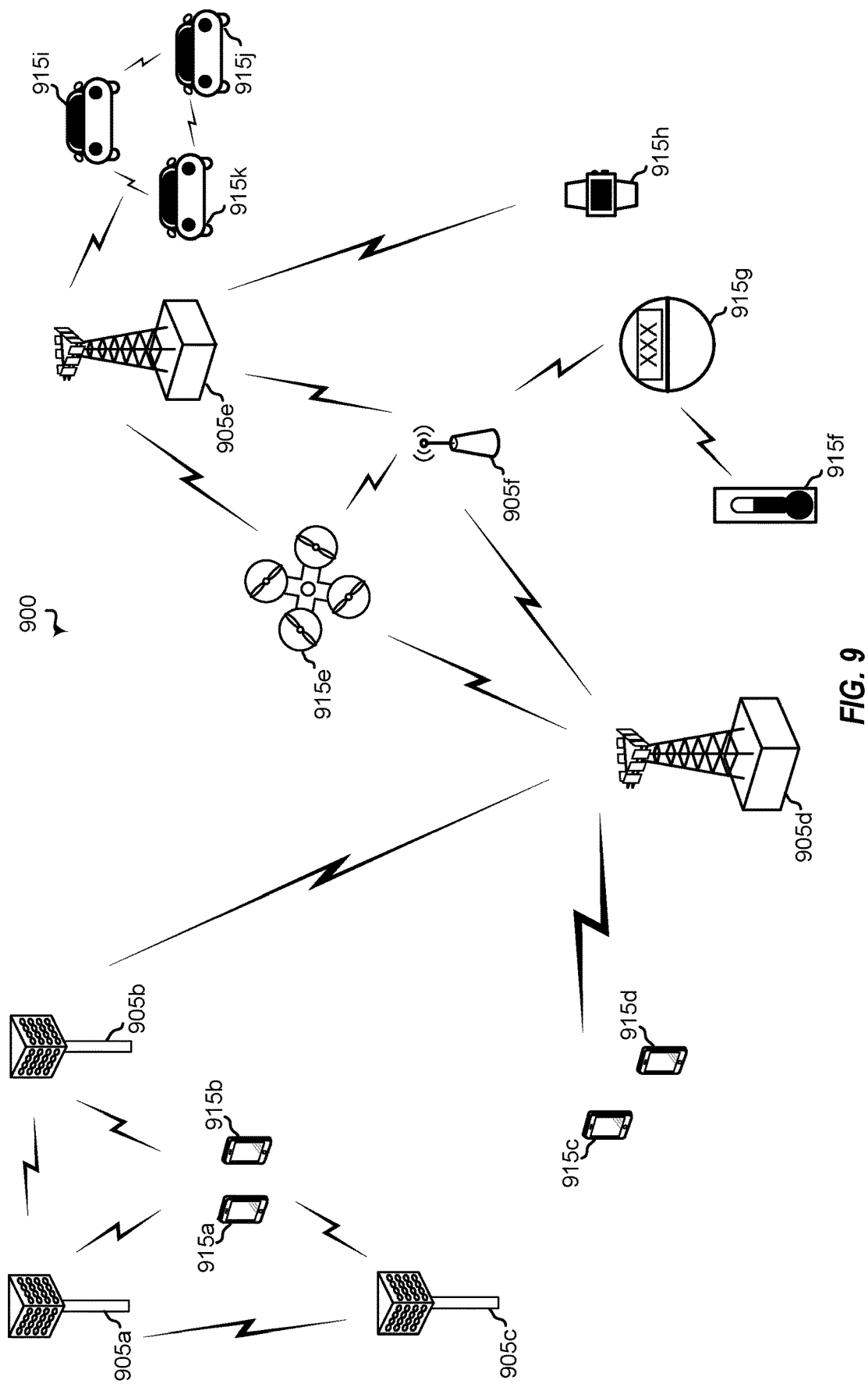
FIG. 9 is a block diagram illustrating details of an example wireless communication system according to one or more aspects.

FIG. 9 is a block diagram illustrating details of an example wireless communication system according to one or more aspects. The wireless communication system may include wireless network 900. Wireless network 900 may, for example, include a 5G wireless network. As appreciated by those skilled in the art, components appearing in FIG. 9 are likely to have related counterparts in other network arrangements including, for example, cellular-style network arrangements and non-cellular-style-network arrangements (e.g., device to device or peer to peer or ad hoc network arrangements, etc.).

Wireless network 900 illustrated in FIG. 9 includes a number of base stations 905 and other network entities. A base station may be a station that communicates with the UEs and may also be referred to as an evolved node B (eNB), a next generation eNB (gNB), an access point, and the like. Each base station 905 may provide communication coverage for a particular geographic area. In 3GPP, the term "cell" may refer to this particular geographic coverage area of a base station or a base station subsystem serving the coverage area, depending on the context in which the term is used. In implementations of wireless network 900 herein, base stations 905 may be associated with a same operator or different operators (e.g., wireless network 900 may include a plurality of operator wireless networks). Additionally, in implementations of wireless network 900 herein, base station 905 may provide wireless communications using one or more of the same frequencies (e.g., one or more frequency bands in licensed spectrum, unlicensed spectrum, or a combination thereof) as a neighboring cell. In some examples, an individual base station 905 or UE 915 may be operated by more than one network operating entity. In some other examples, each base station 905 and UE 915 may be operated by a single network operating entity. Either the base station 905 or the UE 915 or other devices communicating on the wireless network 900 may implement embodiments of receiver circuitry described herein, including various aspects or combinations of aspects of the testing described herein, such as with reference to FIG. 1, FIG. 2, FIG. 3, FIG. 4, FIG. 5, FIG. 6A, FIG. 6B, FIG. 7, and/or FIG. 8 for testing various aspects of a UE and/or operation of the UE on configurations of wireless networks as described with reference to FIG. 9, FIG. 10, and/or FIG. 11.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 9, base stations 905d and 905e are regular macro base stations, while base stations 905a-905c are macro base stations enabled with one of 3 dimension (3D), full dimension (FD), or massive MIMO. Base stations 905a-905c take advantage of their higher dimension MIMO capabilities to exploit 3D beamforming in both elevation and azimuth beamforming to increase coverage and capacity. Base station 905f is a small cell base station which may be a home node or portable access point. A base station may support one or multiple (e.g., two, three, four, and the like) cells.

Wireless network 900 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 915 are dispersed throughout the wireless network 900, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move and may be stationary. Some non-limiting examples of a mobile apparatus, such as may include implementations of one or more of UEs 915, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 915a-915d of the implementation illustrated in FIG. 9 are examples of mobile smart phone-type devices accessing wireless network 900. A UE may also be a machine specifically configured for connected communication, including machine type communication (MTC), enhanced MTC (eMTC), narrowband IoT (NB-IoT) and the like. UEs 915e-915k illustrated in FIG. 9 are examples of various machines configured for communication that access wireless network 900.

A mobile apparatus, such as UEs 915, may be able to communicate with any type of the base stations, whether macro base stations, pico base stations, femto base stations, relays, and the like. In FIG. 9, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 900 may occur using wired or wireless communication links.

In operation at wireless network 900, base stations 905a-905c serve UEs 915a and 915b using 3D beamforming and coordinated spatial techniques, such as coordinated multi-point (CoMP) or multi-connectivity. Macro base station 905d performs backhaul communications with base stations 905a-905c, as well as small cell, base station 905f. Macro base station 905d also transmits multicast services which are subscribed to and received by UEs 915c and 915d. Such multicast services may include mobile television or stream video, or may include other services for providing community information, such as weather emergencies or alerts, such as Amber alerts or gray alerts.

Wireless network 900 of implementations supports mission critical communications with ultra-reliable and redundant links for mission critical devices, such UE 915e, which is a drone. Redundant communication links with UE 915e include from macro base stations 905d and 905e, as well as small cell base station 905f. Other machine type devices, such as UE 915f (thermometer), UE 915g (smart meter), and UE 915h (wearable device) may communicate through wireless network 900 either directly with base stations, such as small cell base station 905f, and macro base station 905e, or in multi-hop configurations by communicating with another user device which relays its information to the network, such as UE 915f communicating temperature measurement information to the smart meter, UE 915g, which is then reported to the network through small cell base station 905f. Wireless network 900 may also provide additional network efficiency through dynamic, low-latency TDD communications or low-latency FDD communications, such as in a vehicle-to-vehicle (V2V) mesh network between UEs 915i-915k communicating with macro base station 905e.

Figure 10:
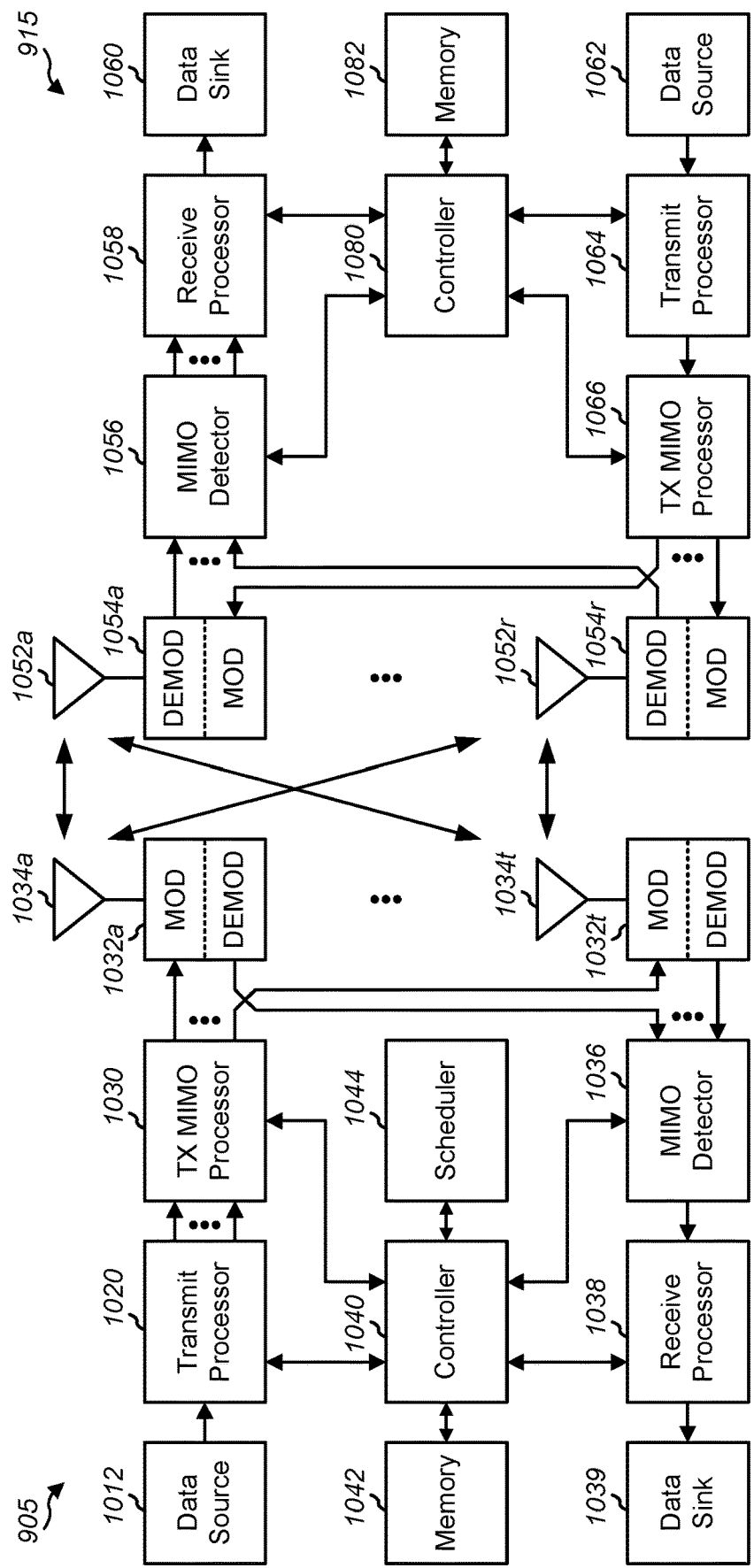
FIG. 10 is a block diagram illustrating examples of a base station and a user equipment (UE) according to one or more aspects.

FIG. 10 is a block diagram illustrating examples of base station 905 and UE 915 according to one or more aspects. Base station 905 and UE 915 may be any of the base stations and one of the UEs in FIG. 9. For a restricted association scenario (as mentioned above), base station 905 may be small cell base station 905f in FIG. 9, and UE 915 may be UE 915c or 915d operating in a service area of base station 905f, which in order to access small cell base station 905f, would be included in a list of accessible UEs for small cell base station 905f. Base station 905 may also be a base station of some other type. As shown in FIG. 10, base station 905 may be equipped with antennas 1034a through 1034t, and UE 915 may be equipped with antennas 1052a through 1052r for facilitating wireless communications.

At base station 905, transmit processor 1020 may receive data from data source 1012 and control information from controller 1040, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 1020 may process (e.g., encode and symbol map) the data and control information to obtain data symbols and control symbols, respectively. Transmit processor 1020 may also generate reference symbols, e.g., for the primary synchronization signal (PSS) and secondary synchronization signal (SSS), and cell-specific reference signal. Transmit (TX) MIMO processor 1030 may perform spatial processing (e.g., precoding) on the data symbols, the control symbols, or the reference symbols, if applicable, and may provide output symbol streams to modulators (MODs) 1032a through 1032t. For example, spatial processing performed on the data symbols, the control symbols, or the reference symbols may include precoding. Each modulator 1032 may process a respective output symbol stream (e.g., for OFDM, etc.) to obtain an output sample stream. Each modulator 1032 may additionally or alternatively process (e.g., convert to analog, amplify, filter, and upconvert) the output sample stream to obtain a downlink signal. Downlink signals from modulators 1032a through 1032t may be transmitted via antennas 1034a through 1034t, respectively.

At UE 915, antennas 1052a through 1052r may receive the downlink signals from base station 905 and may provide received signals to demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. MIMO detector 1056 may obtain received symbols from demodulators 1054a through 1054r, perform MIMO detection on the received symbols if applicable, and provide detected symbols. Receive processor 1058 may process (e.g., demodulate, deinterleave, and decode) the detected symbols, provide decoded data for UE 915 to data sink 1060, and provide decoded control information to controller 1080, such as a processor.

On the uplink, at UE 915, transmit processor 1064 may receive and process data (e.g., for a physical uplink shared channel (PUSCH)) from data source 1062 and control information (e.g., for a physical uplink control channel (PUCCH)) from controller 1080. Additionally, transmit processor 1064 may also generate reference symbols for a reference signal. The symbols from transmit processor 1064 may be precoded by TX MIMO processor 1066 if applicable, further processed by modulators 1054*a* through 1054*r* (e.g., for SC-FDM, etc.), and transmitted to base station 905. At base station 905, the uplink signals from UE 915 may be received by antennas 1034, processed by demodulators 1032, detected by MIMO detector 1036 if applicable, and further processed by receive processor 1038 to obtain decoded data and control information sent by UE 915. Receive processor 1038 may provide the decoded data to data sink 1039 and the decoded control information to controller 1040.

Controllers 1040 and 1080 may direct the operation at base station 905 and UE 915, respectively. Controller 1040 or other processors and modules at base station 905 or controller 1080 or other processors and modules at UE 915 may perform or direct the execution of various processes within the devices and/or the wireless network. Memories 1042 and 1082 may store data and program codes for base station 905 and UE 915, respectively. Scheduler 1044 may schedule UEs for data transmission on the downlink or the uplink.

In some cases, UE 915 and base station 905 may operate in a shared radio frequency spectrum band, which may include licensed or unlicensed (e.g., contention-based) frequency spectrum. In an unlicensed frequency portion of the shared radio frequency spectrum band, UEs 915 or base stations 905 may traditionally perform a medium-sensing procedure to contend for access to the frequency spectrum. For example, UE 915 or base station 905 may perform a listen-before-talk or listen-before-transmitting (LBT) procedure such as a clear channel assessment (CCA) prior to communicating to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own back-off window based on the amount of energy detected on a channel or the acknowledge/negative-acknowledge (ACK/NACK) feedback for its own transmitted packets as a proxy for collisions.

Figure 11:
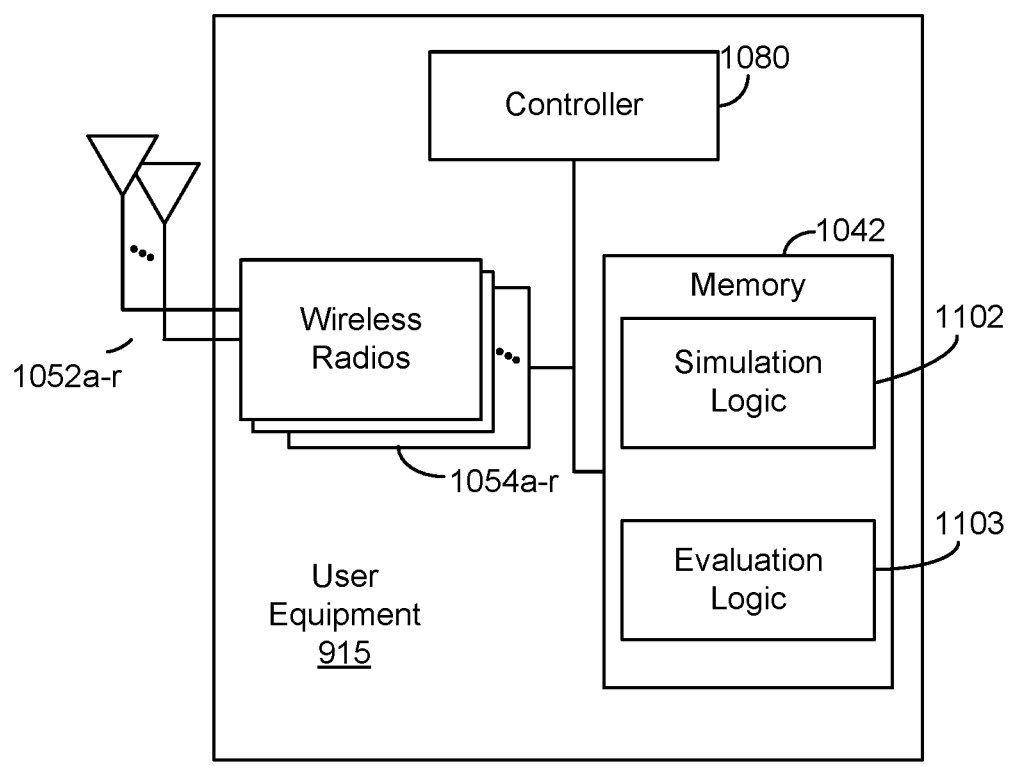
FIG. 11 is a block diagram illustrating examples of a user equipment configured to perform operations for device testing and evaluation according to one or more aspects.

FIG. 11 is a block diagram illustrating user equipment 915 configured according to one aspect of the present disclosure. UE 915 includes the structure, hardware, and components as illustrated for UE 915 of FIG. 1, FIG. 3, and/or FIG. 6. For example, UE 905 includes controller/processor 1080, which operates to execute logic or computer instructions stored in memory 1042, as well as controlling the components of UE 915 that provide the features and functionality of UE 915. UE 915, under control of controller/processor 1080, transmits and receives signals via wireless radios 1054*a-r* and antennas 1052*a-r*. Wireless radios includes various components and hardware, as illustrated in FIG. 10 for UE 915, including modulator/demodulators 1054*a-r*, MIMO detector 1056, receive processor 1058, transmit processor 1064, and TX MIMO processor 1066. The controller/processor 1080 may include means 1102 for simulating aspects of the BS 905 or UE 915, such as by configuring wireless radios 1054*a-r* to store uplink data in memory 1042, such that the uplink data may be output to wireless radios 1054*a-r* as simulated downlink data that may be processed by controller 1080. Means 1102 may include logic circuitry such as one or more of CPU 102, GPU 104, or DSP 108 executing fixed function or programmable units to perform the operations described above with reference to FIGS. 1-8. The controller/processor 1080 may also include means 1104 for evaluating the processing of the simulated downlink data for validation according to wireless standards or other criteria and/or thermal or power performance of the controller 1080. Means 1104 may include logic circuitry such as one or more of CPU 102, GPU 104, or DSP 108 executing fixed function or programmable units to perform the operations described above with reference to FIGS. 1-8.

In one or more aspects, techniques are described for simulating aspects of a wireless network and evaluating performance of an apparatus using the simulated aspects of the wireless network. The apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In one or more aspects, techniques are described for simulating aspects of a wireless network and evaluating performance of an apparatus using the simulated aspects of the wireless network. The performance may be used to revise configuration of the apparatus to improve performance and/or validate software and hardware of the apparatus without specialized testing equipment. In one or more aspects, simulating aspects of the wireless network may include an apparatus configured to determine downlink control information (DCI) of a first wireless network, such as by generating the DCI within the apparatus or determining the DCI based on received transmissions from a wireless network. The apparatus is further configured to determine, based at least in part on the DCI, uplink data. The apparatus is also configured to store the uplink data in the memory. The apparatus is further configured to retrieve the uplink data from the memory for use as simulated downlink data of the first wireless network. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus and include simulating aspects of a wireless network.

In a first aspect, the apparatus is configured to perform further operations of processing the simulated downlink data and evaluating the processing of the simulated downlink data.

In a second aspect, in combination with the first aspect, the evaluating includes determining compliance of the processing with a wireless network.

In a third aspect, in combination with the second aspect, the evaluating includes determining a thermal profile and/or power profile of the processor during the processing.

In a fourth aspect, in combination with one or more of the first aspect through the third aspect, processing the simulated downlink data includes isolating at least one of an uplink protocol layer or a downlink protocol layer for the evaluating.

In a fifth aspect, in combination with one or more of the first aspect through the fourth aspect, determining uplink data includes receiving user application data as the uplink data and/or packaging the received user application data in frames for transmission on a wireless network.

In a sixth aspect, in combination with the fifth aspect, determining uplink data includes receiving first video data of a first participant of a video call. Processing the simulated downlink data includes simulating a second participant for the video call based on the simulated downlink data.

In a seventh aspect, in combination with one or more of the fifth aspect through the sixth aspect, receiving user application data includes receiving an Internet Control Message Protocol (ICMP) request. Processing the simulated downlink data includes generating an ICMP response by switching a source address and a destination address of the ICMP request.

In an eighth aspect, in combination with one or more of the first aspect through the seventh aspect, the processor is further configured to perform operations of communicating over the first wireless network based, at least in part, on one or more predetermined parameters.

In a ninth aspect, in combination with the eighth aspect, training a machine learning algorithm based, at least in part, on the evaluating of the processing of the simulated downlink data.

In a tenth aspect, in combination with the ninth aspect, determining the one or more predetermined parameters based, at least in part, on the machine learning algorithm.

In an eleventh aspect, alone or in combination with one or more of the first aspect through the tenth aspect, determining downlink control information (DCI) includes determining a simulated downlink scheduling assignment for the simulated downlink data corresponding to the uplink data.

In a twelfth aspect, in combination with the eleventh aspect, determining a simulated downlink scheduling assignment includes correlating the simulated downlink scheduling assignment with a predetermined delay.

In a thirteenth aspect, in combination with the twelfth aspect, determining a simulated downlink scheduling assignment includes correlating the simulated downlink scheduling assignment with availability of the simulated downlink data in the memory.

In a fourteenth aspect, alone or in combination with one or more of the first aspect through the thirteenth aspect, the processor includes a digital signal processor (DSP) configured to perform the determining downlink control information (DCI) of a first wireless network.

In a fifteenth aspect, in combination with the fourteenth aspect, the processor includes wireless connectivity including a grant processor. The grant processor is configured to configure the wireless connectivity for storing the uplink data in the memory.

In a sixteenth aspect, alone or in combination with one or more of the first aspect through the fifteenth aspect, the processor is configured to perform the operations of determining a DCI, determining uplink data, and storing the uplink data in a testing mode. The processor is further configured to perform operations of entering testing mode after receiving an instruction from an external component.

In a seventeenth aspect, alone or in combination with one or more of the first aspect through the sixteenth aspect, the processor is configured to perform further operations of transmitting and receiving on a second wireless network while determining downlink control information (DCI) of a first wireless network or simulating a second wireless network while determining DCI of the first wireless network. In an alternative seventeenth aspect, or in combination with the other seventeenth aspect, the processor may be configured to simulate a second wireless network while determining downlink control information (DCI) of the first wireless network.

In an eighteenth aspect, alone or in combination with one or more of the first aspect through the seventeenth aspect, the processor is configured to perform further operations of processing the simulated downlink data, receiving temperature data regarding the apparatus during the processing of the simulated downlink data, and transmitting information regarding the simulated downlink data and the temperature data to a server.

In a nineteenth aspect, alone or in combination with one or more of the first aspect through the eighteenth aspect, the processor is configured to perform further operations of receiving user data from a user application. The determining of the uplink data is based, at least in part, on the user data; determining acknowledgements/negative acknowledgements (ACKs/NACKs) independent of transmissions received on the first wireless network and providing the acknowledgements/negative acknowledgements (ACKs/NACKs) to the user application.

In a twentieth aspect, alone or in combination with one or more of the first aspect through the nineteenth aspect, the apparatus is a user equipment (UE).

In a twenty-first aspect, alone or in combination with one or more of the first aspect through the twentieth aspect, the apparatus is a base station (BS).

In one or more aspects, techniques for supporting determining downlink control information (DCI) of a first wireless network may include additional aspects, such as any single aspect or any combination of aspects described below or in connection with one or more other processes or devices described elsewhere herein. In one or more aspects, supporting simulation of wireless networks may include a method of performing operations including determining, based at least in part on the DCI, uplink data. The method may also include storing the uplink data in memory. The method may also include retrieving the uplink data from the memory for use as simulated downlink data of the first wireless network. Additionally, the method may include one or more aspects as described below. In some implementations, the method is implemented in an apparatus such as a wireless device.

In a twenty-second aspect, the method may include processing the simulated downlink data and evaluating the processing of the simulated downlink data.

In a twenty-third aspect, in combination with the twenty-second aspect, the evaluating includes determining compliance of the processing with a wireless network.

In a twenty-fourth aspect, in combination with one or more of the twenty-second aspect through the twenty-third aspect, the evaluating includes determining a thermal profile of a processor during the processing.

In a twenty-fifth aspect, in combination with one or more of the twenty-second aspect through the twenty-fourth aspect, processing the simulated downlink data includes isolating at least one of an uplink protocol layer or a downlink protocol layer for the evaluating.

In a twenty-sixth aspect, in combination with one or more of the twenty-second aspect through the twenty-fifth aspect, determining uplink data includes packaging user application data in frames configured for transmission on the wireless network according to the wireless network configuration as the uplink data.

In a twenty-seventh aspect, in combination with the twenty-sixth aspect, determining uplink data includes receiving first video data of a first participant of a video call and/or packaging the video data in frames for transmission on a wireless network. Processing the simulated downlink data includes simulating a second participant for the video call based on the simulated downlink data.

In a twenty-eighth aspect, in combination with one or more of the twenty-sixth aspect through the twenty-seventh aspect, receiving user application data includes receiving an Internet Control Message Protocol (ICMP) request. Processing the simulated downlink data includes generating an ICMP response by switching a source address and a destination address of the ICMP request.

In a twenty-ninth aspect, in combination with one or more of the twenty-second aspect through the twenty-eighth aspect, the method includes communicating over the first wireless network based, at least in part, on one or more predetermined parameters; training a machine learning algorithm based, at least in part, on the evaluating of the processing of the simulated downlink data; and determining the one or more predetermined parameters based, at least in part, on the machine learning algorithm.

In a thirtieth aspect, alone or in combination with one or more of the twenty-second aspect through the twenty-ninth aspect, determining downlink control information (DCI) includes determining a simulated downlink scheduling assignment for the simulated downlink data corresponding to the uplink data.

In a thirty-first aspect, in combination with the thirtieth aspect, determining a simulated downlink scheduling assignment includes correlating the simulated downlink scheduling assignment with a predetermined delay.

In a thirty-second aspect, in combination with the thirty-first aspect, determining a simulated downlink scheduling assignment includes correlating the simulated downlink scheduling assignment with availability of the simulated downlink data in the memory.

In a thirty-third aspect, alone or in combination with one or more of the twenty-second aspect through the thirty-second aspect, determining downlink control information (DCI) of a first wireless network is performed by a digital signal processor (DSP).

In a thirty-fourth aspect, in combination with the thirty-fourth aspect, the method includes the wireless connectivity storing the uplink data in the memory based on the DSP determining DCI of the first wireless network.

In a thirty-fifth aspect, alone or in combination with one or more of the twenty-second aspect through the thirty-third aspect, the operations of determining DCI, determining uplink data, and storing the uplink data are performed based on entering a testing mode.

In a thirty-sixth aspect, alone or in combination with one or more of the twenty-second aspect through the thirty-fifth aspect, the method includes transmitting and receiving on a second wireless network while determining downlink control information (DCI) of a first wireless network. In an alternative thirty-sixth aspect, or in combination with the other thirty-sixth aspect, the method may include simulating a second wireless network while determining downlink control information (DCI) of the first wireless network.

In a thirty-seventh aspect, alone or in combination with one or more of the twenty-second aspect through the thirty-sixth aspect, the method includes processing the simulated downlink data.

In a thirty-eighth aspect, in combination with the thirty-seventh aspect, the method includes receiving temperature data regarding the apparatus, the temperature data corresponding to temperatures of one or more components during the processing of the simulated downlink data.

In a thirty-ninth aspect, in combination with the thirty-eighth aspect, the method includes transmitting information regarding the simulated downlink data and the temperature data to a server.

In a fortieth aspect, alone or in combination with one or more of the twenty-second aspect through the thirty-ninth aspect, the method includes receiving user data from a user application. The determining of the uplink data is based, at least in part, on the user data.

In a forty-first aspect, in combination with the fortieth aspect, the method includes determining acknowledgements/negative acknowledgements (ACKs/NACKs) independent of transmissions received on the first wireless network.

In a forty-second aspect, in combination with the forty-first aspect, the method includes providing the acknowledgements/negative acknowledgements (ACKs/NACKs) to the user application.

In a forty-third aspect, alone or in combination with one or more of the twenty-second aspect through the forty-second aspect, the operations of determining a DCI, determining uplink data, and storing the uplink data are performed by a user equipment (UE).

In a forty-fourth aspect, alone or in combination with one or more of the twenty-second aspect through the forty-third aspect, the operations of determining a DCI, determining uplink data, and storing the uplink data are performed by a base station (BS).

In one or more aspects, techniques for supporting a non-transitory computer-readable medium storing instructions that, when executed by a processor of a device, cause the device to perform operations may include additional aspects, such as any single aspect or any combination of aspects described below or in connection with one or more other processes or devices described elsewhere herein. In one or more aspects, supporting simulating a wireless network may include an apparatus configured to determine downlink control information (DCI) of a first wireless network. The apparatus is further configured to determine, based at least in part on the DCI, uplink data. The apparatus is further configured to store the uplink data in a memory. The apparatus is further configured to retrieve the uplink data from the memory for use as simulated downlink data of the first wireless network. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-fifth aspect, the apparatus is configured with instructions that, when executed by the processor of the device, cause the device to perform operations including processing the simulated downlink data; and evaluating the processing of the simulated downlink data.

In a forty-sixth aspect, in combination with the forty-fifth aspect, the evaluating includes determining compliance of the processing with a wireless network.

In a forty-seventh aspect, in combination with one or more of the forty-fifth through the forty-sixth aspect, the evaluating includes determining a thermal profile of the processor during the processing.

In a forty-eighth aspect, in combination with one or more of the forty-fifth aspect through the forty-seventh aspect, processing the simulated downlink data includes isolating at least one of an uplink protocol layer or a downlink protocol layer for the evaluating.

In a forty-ninth aspect, in combination with one or more of the forty-fifth aspect through the forty-eighth aspect, determining uplink data includes receiving user application data as the uplink data and/or packaging the application data in a frame based on a configuration of the wireless network for transmission on the wireless network.

In a fiftieth aspect, in combination with the forty-ninth aspect, determining uplink data includes packaging first video data for a first participant of a video call. Processing the simulated downlink data includes simulating a second participant for the video call based on the simulated downlink data.

In a fifty-first aspect, in combination with one or more of the forty-ninth aspect through the fiftieth aspect, receiving user application data includes receiving an Internet Control Message Protocol (ICMP) request. Processing the simulated downlink data includes generating an ICMP response by switching a source address and a destination address of the ICMP request.

In a fifty-second aspect, in combination with one or more of the forty-fifth aspect through the fifty-first aspect, the apparatus is configured with instructions that, when executed by the processor of the device, cause the device to perform operations including communicating over the first wireless network based, at least in part, on one or more predetermined parameters.

In a fifty-third aspect, in combination with the fifty-second aspect, the apparatus is configured with instructions that train a machine learning algorithm based, at least in part, on the evaluating of the processing of the simulated downlink data.

In a fifty-fourth aspect, in combination with the fifty-third aspect, the apparatus is configured with instructions that determine the one or more predetermined parameters based, at least in part, on the machine learning algorithm.

In a fifty-fifth aspect, alone or in combination with one or more of the forty-fifth aspect through the fifty-fourth aspect, determining downlink control information (DCI) includes determining a simulated downlink scheduling assignment for the simulated downlink data corresponding to the uplink data.

In a fifty-sixth aspect, in combination with the fifty-fifth aspect, determining a simulated downlink scheduling assignment includes correlating the simulated downlink scheduling assignment with a predetermined delay.

In a fifty-seventh aspect, in combination with the fifty-sixth aspect, determining a simulated downlink scheduling assignment includes correlating the simulated downlink scheduling assignment with availability of the simulated downlink data in the memory.

In a fifty-eighth aspect, alone or in combination with one or more of the forty-fifth aspect through the fifty-seventh aspect, the instructions cause the device to perform operations including determining downlink control information (DCI) of a first wireless network using a digital signal processor (DSP).

In a fifty-ninth aspect, in combination with the fifty-eighth aspect, the apparatus is configured with instructions that, when executed by the processor of the device, cause the device to perform operations including configuring wireless connectivity for storing the uplink data in the memory.

In a sixtieth aspect, alone or in combination with one or more of the forty-fifth aspect through the fifty-ninth aspect, the instructions cause the device to perform operations including determining DCI, determining uplink data, and storing the uplink data in a testing mode.

In a sixty-first aspect, alone or in combination with one or more of the forty-fifth aspect through the sixtieth aspect, the apparatus is configured with instructions that, when executed by the processor of the device, cause the device to perform operations including transmitting and receiving on a second wireless network while determining downlink control information (DCI) of a first wireless network. In an alternative sixty-first aspect, or in combination with the other sixty-first aspect, the apparatus may be configured with instructions to simulate a second wireless network while determining downlink control information (DCI) of the first wireless network.

In a sixty-second aspect, alone or in combination with one or more of the forty-fifth aspect through the sixty-first aspect, the apparatus is configured to the apparatus is configured with instructions that, when executed by the processor of the device, cause the device to perform operations including processing the simulated downlink data.

In a sixty-third aspect, in combination with the sixty-second aspect, the apparatus is configured with instructions that cause the processor to receive temperature data representative of a temperature related to the processing of the simulated downlink data.

In a sixty-fourth aspect, in combination with the sixty-third aspect, the apparatus with instructions that cause the processor to transmit information regarding the simulated downlink data and the temperature data to a server.

In a sixty-fifth aspect, alone or in combination with one or more of the forty-fifth aspect through the sixty-fourth aspect, the apparatus is configured with instructions that, when executed by the processor of the device, cause the device to perform operations including receiving user data from a user application. The determining of the uplink data is based, at least in part, on the user data.

In a sixty-sixth aspect, in combination with the sixty-fifth aspect, the apparatus is configured with instructions that, when executed by the processor, cause the device to generate acknowledgements/negative acknowledgements (ACKs/NACKs) independent of transmissions received on the first wireless network.

In a sixty-seventh aspect, in combination with the sixty-sixth aspect, the apparatus is configured with instructions that, when executed by the processor of the device, cause the device to provide the acknowledgements/negative acknowledgements (ACKs/NACKs) to the user application.

In a sixty-eighth aspect, alone or in combination with one or more of the forty-fifth aspect through the sixty-seventh aspect, the instructions, when executed by the processor of the device, cause a user equipment (UE) to perform the operations including determining downlink control information (DCI), determining uplink data, storing the uplink data, and retrieving the uplink data.

In a sixty-ninth aspect, alone or in combination with one or more of the forty-fifth aspect through the sixty-eighth aspect, the instructions, when executed by the processor of the device, cause a base station (BS) to perform the operations including determining downlink control information (DCI), determining uplink data, storing the uplink data, and retrieving the uplink data.

In one or more aspects, techniques for supporting simulating wireless networks may include additional aspects, such as any single aspect or any combination of aspects described below or in connection with one or more other processes or devices described elsewhere herein. In one or more aspects, supporting simulating wireless networks may include an apparatus configured with means for determining downlink control information (DCI) of a first wireless network. The apparatus is further configured with means for determining, based at least in part on the DCI, uplink data. The apparatus is further configured with means for storing the uplink data in a memory. The apparatus is further configured with means for retrieving the uplink data from the memory for use as simulated downlink data of the first wireless network. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventieth aspect, the apparatus includes means for processing the simulated downlink data and means for evaluating the processing of the simulated downlink data.

In a seventy-first aspect, in combination with the seventieth aspect, the evaluating means includes determining compliance of the processing with a wireless network.

In a seventy-second aspect, in combination with one or more of the seventieth aspect through the seventy-first aspect, the evaluating means includes means for determining a thermal profile of the processor during the processing.

In a seventy-third aspect, in combination with one or more of the seventieth aspect through the seventy-second aspect, the processing means includes means for isolating at least one of an uplink protocol layer or a downlink protocol layer for the evaluating.

In a seventy-fourth aspect, in combination with one or more of the seventieth aspect through the seventy-third aspect, the determining means includes means for packaging user application data as the uplink data.

In a seventy-fifth aspect, in combination with the seventy-fourth aspect, the determining means includes means for packaging first video data for a first participant of a video call. The processing means includes means for simulating a second participant for the video call based on the simulated downlink data.

In a seventy-sixth aspect, in combination with one or more of the seventy-fourth aspect through the seventy-fifth aspect, the receiving means includes means for receiving an Internet Control Message Protocol (ICMP) request. The processing means includes means for determining an ICMP response by switching a source address and a destination address of the ICMP request.

In a seventy-seventh aspect, in combination with one or more of the seventieth aspect through the seventy-sixth aspect, the apparatus includes means for communicating over the first wireless network. The communicating means communicate based, at least in part, on one or more predetermined parameters; means for training a machine learning algorithm based, at least in part, on the evaluating of the processing of the simulated downlink data; and means for determining the one or more predetermined parameters based, at least in part, on the machine learning algorithm.

In a seventy-eighth aspect, alone or in combination with one or more of the seventieth aspect through the seventy-seventh aspect, the means for determining downlink control information (DCI) includes means for determining a simulated downlink scheduling assignment for the simulated downlink data corresponding to the uplink data.

In a seventy-ninth aspect, in combination with the seventy-eighth aspect, the means for determining a simulated downlink scheduling assignment includes means for correlating the simulated downlink scheduling assignment with a predetermined delay.

In a eightieth aspect, in combination with the seventy-ninth aspect, the means for determining a simulated downlink scheduling assignment includes means for correlating the simulated downlink scheduling assignment with availability of the simulated downlink data in the memory.

In a eighty-first aspect, alone or in combination with one or more of the seventieth aspect through the eightieth aspect, the means for determining downlink control information (DCI) includes a digital signal processor (DSP).

In a eighty-second aspect, in combination with the eighty-first aspect, the apparatus is configured with means for configuring wireless connectivity for storing the uplink data in the memory based on the DSP determining DCI of the first wireless network.

In a eighty-third aspect, alone or in combination with one or more of the seventieth aspect through the eighty-second aspect, the means for determining DCI, means for determining uplink data, and means for storing the uplink data are configured based on entering a testing mode.

In a eighty-fourth aspect, alone or in combination with one or more of the seventieth aspect through the eighty-third aspect, the apparatus is configured with means for transmitting and receiving on a second wireless network while determining downlink control information (DCI) of a first wireless network. In an alternative eighty-fourth aspect, or in combination with the other eighty-forth aspect, the apparatus is configured with means to simulate a second wireless network while determining downlink control information (DCI) of the first wireless network.

In a eighty-fifth aspect, alone or in combination with one or more of the seventieth aspect through the eighty-fourth aspect, the apparatus is configured with means for processing the simulated downlink data; means for receiving temperature data regarding the apparatus during the processing of the simulated downlink data; and means for transmitting information regarding the simulated downlink data and the temperature data to a server.

In a eighty-sixth aspect, alone or in combination with one or more of the seventieth aspect through the eighty-fifth aspect, the apparatus is configured with means for receiving user data from a user application. The determining of the uplink data is based, at least in part, on the user data; means for determining acknowledgements/negative acknowledgements (ACKs/NACKs) independent of transmissions received on the first wireless network; and providing the acknowledgements/negative acknowledgements (ACKs/NACKs) to the user application.

In a eighty-seventh aspect, alone or in combination with one or more of the seventieth aspect through the eighty-sixth aspect, the apparatus is a user equipment (UE).

In a eighty-eighth aspect, alone or in combination with one or more of the seventieth aspect through the eighty-seventh aspect, the apparatus is a base station (BS).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 9, FIG. 10, and FIG. 11 include some or all of processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if an apparatus is described as containing components A, B, or C, the apparatus may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   a memory;
   a processor coupled to the memory, the processor configured to perform operations of:
     determining downlink control information (DCI) of a first wireless network, the downlink control information (DCI) comprising simulated downlink scheduling assignments generated by the apparatus;
     determining, based at least in part on the DCI, uplink data;
     storing the uplink data in the memory; and
     retrieving the uplink data from the memory for use as simulated downlink data of the first wireless network.

2. The apparatus of claim 1, wherein the processor is configured to perform further operations of:
   processing the simulated downlink data; and
   evaluating the processing of the simulated downlink data.

3. The apparatus of claim 2, wherein the evaluating comprises at least one of:
   determining compliance of the processing with a wireless network specification;
   determining a power profile of the processor during the processing; or
   determining a thermal profile of the processor during the processing.

4. The apparatus of claim 2, wherein processing the simulated downlink data comprises isolating at least one of an uplink protocol layer or a downlink protocol layer for the evaluating.

5. The apparatus of claim 2, wherein determining uplink data comprises receiving application data of a first participant of a video call, and wherein processing the simulated downlink data comprises simulating a second participant for the video call based on the simulated downlink data.

6. The apparatus of claim 2, wherein the processor is further configured to perform operations of:
communicating based, at least in part, on one or more parameters,
training a machine learning algorithm based, at least in part, on the evaluating of the processing of the simulated downlink data; and
determining the one or more parameters based, at least in part, on the machine learning algorithm.

7. The apparatus of claim 1, wherein determining downlink control information (DCI) comprises:
determining a simulated downlink scheduling assignment for the simulated downlink data corresponding to the uplink data by correlating the simulated downlink scheduling assignment with availability of the simulated downlink data in the memory.

8. The apparatus of claim 1, wherein the processor is configured to perform further operations of at least one of:
transmitting and receiving on a second wireless network while determining downlink control information (DCI) of the first wireless network; or
simulating a second wireless network while determining downlink control information (DCI) of the first wireless network.

9. The apparatus of claim 1, wherein the processor is configured to perform further operations of:
receiving user data from a user application, wherein the determining of the uplink data is based, at least in part, on the user data;
determining acknowledgements/negative acknowledgements (ACK/NACKs) independent of transmissions received on the first wireless network; and
providing the acknowledgements/negative acknowledgements (ACKs/NACKs) to the user application.

10. The apparatus of claim 1, wherein the apparatus comprises a user equipment (UE).

11. The apparatus of claim 1, wherein retrieving the uplink data from the memory for use as the simulated downlink data comprises retrieving simulated downlink data with a source address and a destination address switched.

12. A method, comprising:
determining downlink control information (DCI) of a first wireless network, the downlink control information (DCI) comprising simulated downlink scheduling assignments generated on a device with a memory;
determining, based at least in part on the DCI, uplink data, storing the uplink data in the memory; and
retrieving the uplink data from the memory for use as simulated downlink data of the first wireless network.

13. The method of claim 12, further comprising:
processing the simulated downlink data; and
evaluating the processing of the simulated downlink data.

14. The method of claim 13, wherein the evaluating comprises at least one of: determining compliance of the processing with a wireless network specification; determining a power profile of the processor during the processing; or determining a thermal profile of a processor during the processing.

15. The method of claim 13, wherein processing the simulated downlink data comprises isolating at least one of an uplink protocol layer or a downlink protocol layer for the evaluating.

16. The method of claim 13, wherein determining uplink data comprises receiving user application data comprising first video data of a first participant of a video call, and wherein processing the simulated downlink data comprises simulating a second participant for the video call based on the simulated downlink data.

17. The method of claim 13, wherein the method further comprises:
communicating based, at least in part, on one or more parameters;
training a machine learning algorithm based, at least in part, on the evaluating of the processing of the simulated downlink data; and
determining the one or more parameters based, at least in part, on the machine learning algorithm.

18. The method of claim 12, wherein determining downlink control information (DCI) comprises:
determining a simulated downlink scheduling assignment for the simulated downlink data corresponding to the uplink data by correlating the simulated downlink scheduling assignment with availability of the simulated downlink data in the memory.

19. The method of claim 12, further comprising at least one of:
transmitting and receiving on a second wireless network while generating downlink control information (DCI) of a first wireless network; or
simulating a second wireless network while determining downlink control information (DCI) of the first wireless network.

20. The method of claim 12, further comprising:
receiving user data from a user application, wherein the determining the uplink data is based, at least in part, on the user data;
determining acknowledgements/negative acknowledgements (ACKs/NACKs) independent of transmissions received on the first wireless network; and
providing the acknowledgements/negative acknowledgements (ACKs/NACKs) to the user application.

21. A non-transitory computer-readable medium storing instructions that, when executed by a processor of a device, cause the device to perform operations comprising:
determining downlink control information (DCI) of a first wireless network, the downlink control information (DCI) comprising simulated downlink scheduling assignments generated by the device;
determining, based at least in part on the DCI, uplink data, storing the uplink data in a memory; and
retrieving the uplink data from the memory for use as simulated downlink data of the first wireless network.

22. The non-transitory computer-readable medium of claim 21, further comprising instructions that, when executed by the processor of the device, cause the device to perform operations comprising:
processing the simulated downlink data; and
evaluating the processing of the simulated downlink data.

23. The non-transitory computer-readable medium of claim 22, wherein the evaluating comprises at least one of: determining compliance of the processing with a wireless network specification; determining a power profile of the processor during the processing; or determining a thermal profile of the processor during the processing.

24. The non-transitory computer-readable medium of claim 22, wherein processing the simulated downlink data comprises isolating at least one of an uplink protocol layer for the evaluation.

25. The non-transitory computer-readable medium of claim 22, wherein determining uplink data comprises packaging user application data comprising first video data of a first participant of a video call, and wherein processing the simulated downlink data comprises simulating a second participant for the video call based on the simulated downlink data.

26. The non-transitory computer-readable medium of claim 21, wherein generating downlink control information (DCI) comprises:
   determining a simulated downlink scheduling assignment for the simulated downlink data corresponding to the uplink data by correlating the simulated downlink scheduling assignment with availability of the simulated downlink data in the memory.

27. An apparatus, comprising:
   means for determining downlink control information (DCI) of a first wireless network, the downlink control information (DCI) comprising simulated downlink scheduling assignments generated by the apparatus;
   means for determining, based at least in part on the DCI, uplink data;
   means for storing the uplink data in a memory; and
   means for retrieving the uplink data from the memory for use as simulated downlink data of the first wireless network.

28. The apparatus of claim 27, further comprising:
   means for processing the simulated downlink data; and
   means for evaluating the processing of the simulated downlink data.

29. The apparatus of claim 28, wherein the means for evaluating comprises means for determining a thermal profile of the means for processing.

30. The apparatus of claim 27, wherein the means for determining downlink control information (DCI) comprises:
   means for determining a simulated downlink scheduling assignment for the simulated downlink data corresponding to the uplink data by correlating the simulated downlink scheduling assignment with availability of the simulated downlink data in the memory.

* * * * *